(12) United States Patent
Zewail et al.

(10) Patent No.: US 11,996,972 B2
(45) Date of Patent: May 28, 2024

(54) ADAPTIVE NON-UNIFORM CONSTELLATION OPERATION

(71) Applicant: QUALCOMM Incorporated, San Diego, CA (US)

(72) Inventors: Ahmed Abdelaziz Ibrahim Abdelaziz Zewail, San Diego, CA (US); Xiaoxia Zhang, San Diego, CA (US); Zhifei Fan, San Diego, CA (US); Junyi Li, Fairless Hills, PA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/650,809

(22) Filed: Feb. 11, 2022

(65) Prior Publication Data

US 2023/0261924 A1    Aug. 17, 2023

(51) Int. Cl.
*H04L 27/34* (2006.01)
*H04L 1/00* (2006.01)
*H04L 27/00* (2006.01)

(52) U.S. Cl.
CPC .......... *H04L 27/3483* (2013.01); *H04L 1/003* (2013.01); *H04L 27/0008* (2013.01)

(58) Field of Classification Search
None
See application file for complete search history.

(56) References Cited

U.S. PATENT DOCUMENTS

| 2019/0173726 A1* | 6/2019 | Wong | H04L 27/3405 |
| 2019/0305996 A1* | 10/2019 | Handte | H04L 1/0003 |
| 2021/0111940 A1* | 4/2021 | Huang | H04B 10/5161 |
| 2021/0385118 A1* | 12/2021 | Umehara | H04W 76/10 |

* cited by examiner

*Primary Examiner* — Diane L Lo
(74) *Attorney, Agent, or Firm* — Harrity & Harrity, LLP

(57) ABSTRACT

Various aspects of the present disclosure generally relate to wireless communication. In some aspects, a user equipment (UE) may receive or transmit constellation information that indicates a modulation constellation type associated with a wireless communication, the constellation information indicating, as the modulation constellation type, a uniform constellation (UC) type or a non-uniform constellation (NUC) type. The UE may transmit or receive the wireless communication based at least in part on the modulation constellation type. Numerous other aspects are described.

27 Claims, 11 Drawing Sheets

2D NUC 64-QAM 10 dB

UC 64-QAM

1D NUC 16-QAM

2D NUC 64-QAM 15 dB

| MCS Index $I_{MCS}$ | Modulation Order $Q_m$ | Target code Rate x [1024] R | Spectral efficiency | Constellation type |
|---|---|---|---|---|
| i | 6 | 468 | 2.5664 | 0 |
| i+1 | 6 | 468 | 2.5664 | 1 |
| ⋮ | ⋮ | ⋮ | ⋮ | ⋮ |

FIG. 6

ADAPTIVE NON-UNIFORM CONSTELLATION OPERATION

FIELD OF THE DISCLOSURE

Aspects of the present disclosure generally relate to wireless communication and to techniques and apparatuses for adaptive non-uniform constellation operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving or transmitting constellation information that indicates a modulation constellation type associated with a wireless communication, the constellation information indicating, as the modulation constellation type, a uniform constellation (UC) type or a non-uniform constellation (NUC) type. The method may include transmitting or receiving the wireless communication based at least in part on the modulation constellation type.

Some aspects described herein relate to a method of wireless communication performed by a network entity. The method may include transmitting or receiving constellation information that indicates a modulation constellation type associated with a wireless communication, the constellation information indicating, as the modulation constellation type, a UC type or a NUC type. The method may include receiving or transmitting the wireless communication based at least in part on the modulation constellation type.

Some aspects described herein relate to a non-transitory computer-readable medium that stores a set of instructions for wireless communication by a UE. The set of instructions, when executed by one or more processors of the UE, may cause the UE to receive or transmit constellation information that indicates a modulation constellation type associated with a wireless communication, the constellation information indicating, as the modulation constellation type, a UC type or an NUC type. The set of instructions, when executed by one or more processors of the UE, may cause the UE to transmit or receive the wireless communication based at least in part on the modulation constellation type.

Some aspects described herein relate to a non-transitory computer-readable medium that stores a set of instructions for wireless communication by a network entity. The set of instructions, when executed by one or more processors of the network entity, may cause the base station to transmit or receive constellation information that indicates a modulation constellation type associated with a wireless communication, the constellation information indicating, as the modulation constellation type, a UC type or an NUC type. The set of instructions, when executed by one or more processors of the base station, may cause the base station to receive or transmit the wireless communication based at least in part on the modulation constellation type.

Some aspects described herein relate to an apparatus for wireless communication. The apparatus may include means for receiving or transmitting constellation information that indicates a modulation constellation type associated with a wireless communication, the constellation information indicating, as the modulation constellation type, a UC type or an NUC type. The apparatus may include means for transmitting or receiving the wireless communication based at least in part on the modulation constellation type.

Some aspects described herein relate to an apparatus for wireless communication. The apparatus may include means for transmitting or receiving constellation information that indicates a modulation constellation type associated with a wireless communication, the constellation information indicating, as the modulation constellation type, a UC type or an NUC type. The apparatus may include means for receiving or transmitting the wireless communication based at least in part on the modulation constellation type.

Some aspects described herein relate to an apparatus of a UE for wireless communication. The user equipment may include a memory and one or more processors coupled to the memory. The one or more processors may be configured to receive or transmit constellation information that indicates a modulation constellation type associated with a wireless communication, the constellation information indicating, as the modulation constellation type, a UC type or an NUC type. The one or more processors may be configured to transmit or receive the wireless communication based at least in part on the modulation constellation type.

Some aspects described herein relate to an apparatus of a network entity for wireless communication. The network entity may include a memory and one or more processors coupled to the memory. The one or more processors may be configured to transmit or receive constellation information that indicates a modulation constellation type associated with a wireless communication, the constellation information indicating, as the modulation constellation type, a UC type or an NUC type. The one or more processors may be configured to receive or transmit the wireless communication based at least in part on the modulation constellation type.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example of a modulation and coding scheme (MCS) table that may be used for adaptive non-uniform constellation operation, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
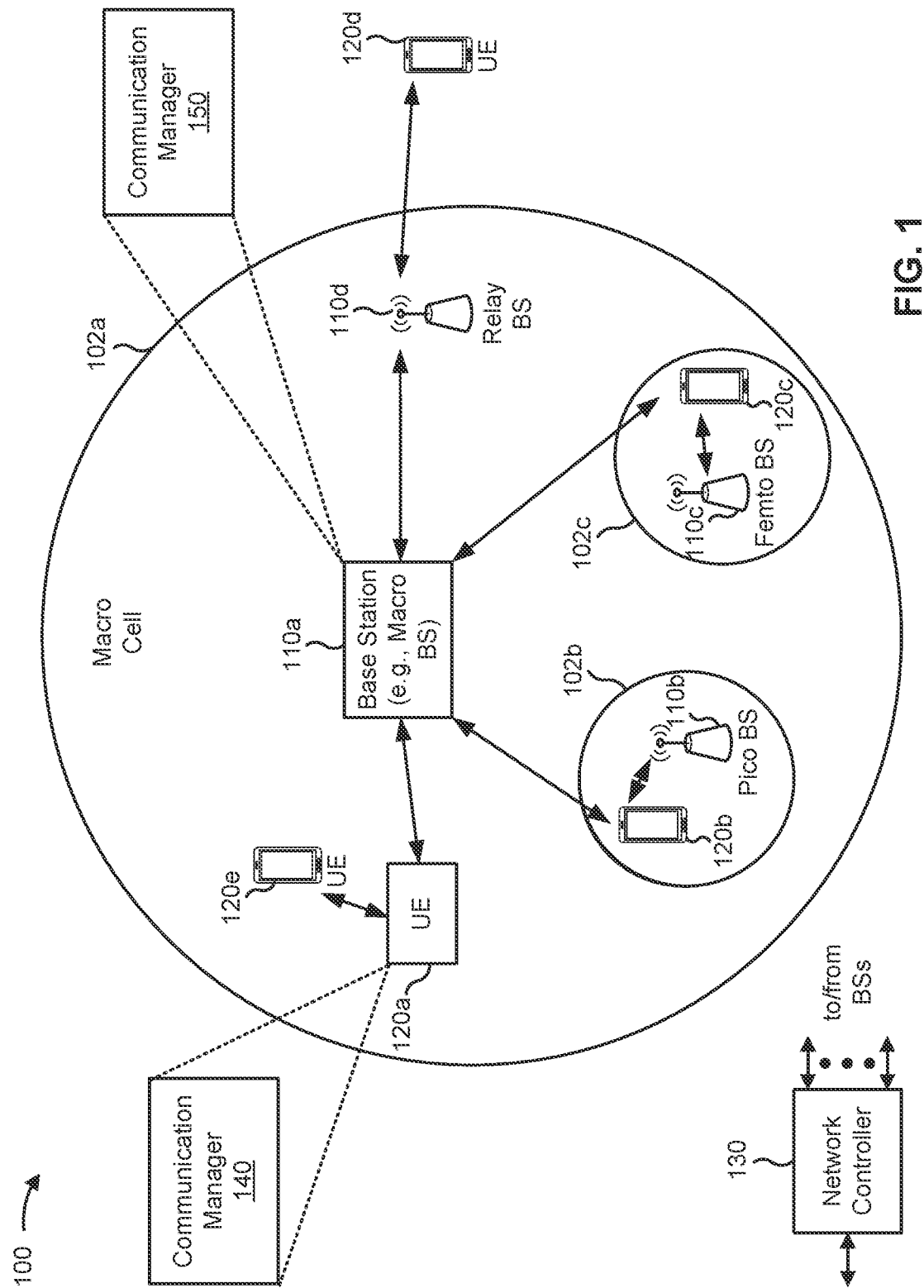
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive or transmit constellation information that indicates a modulation constellation type associated with a wireless communication, the constellation information indicating, as the modulation constellation type, a UC type or an NUC type; and transmit or receive the wireless communication based at least in part on the modulation constellation type. Additionally, or alternatively, the communication manager 140 may perform one or more other operations described herein.

In some aspects, the base station 110 may include a communication manager 150. As described in more detail elsewhere herein, the communication manager 150 may transmit or receive constellation information that indicates a modulation constellation type associated with a wireless communication, the constellation information indicating, as the modulation constellation type, a UC type or an NUC type; and receive or transmit the wireless communication based at least in part on the modulation constellation type. Additionally, or alternatively, the communication manager 150 may perform one or more other operations described herein.

As indicated above, FIG. 1 is provided as an example. Other examples may differ from what is described with regard to FIG. 1.

Figure 2:
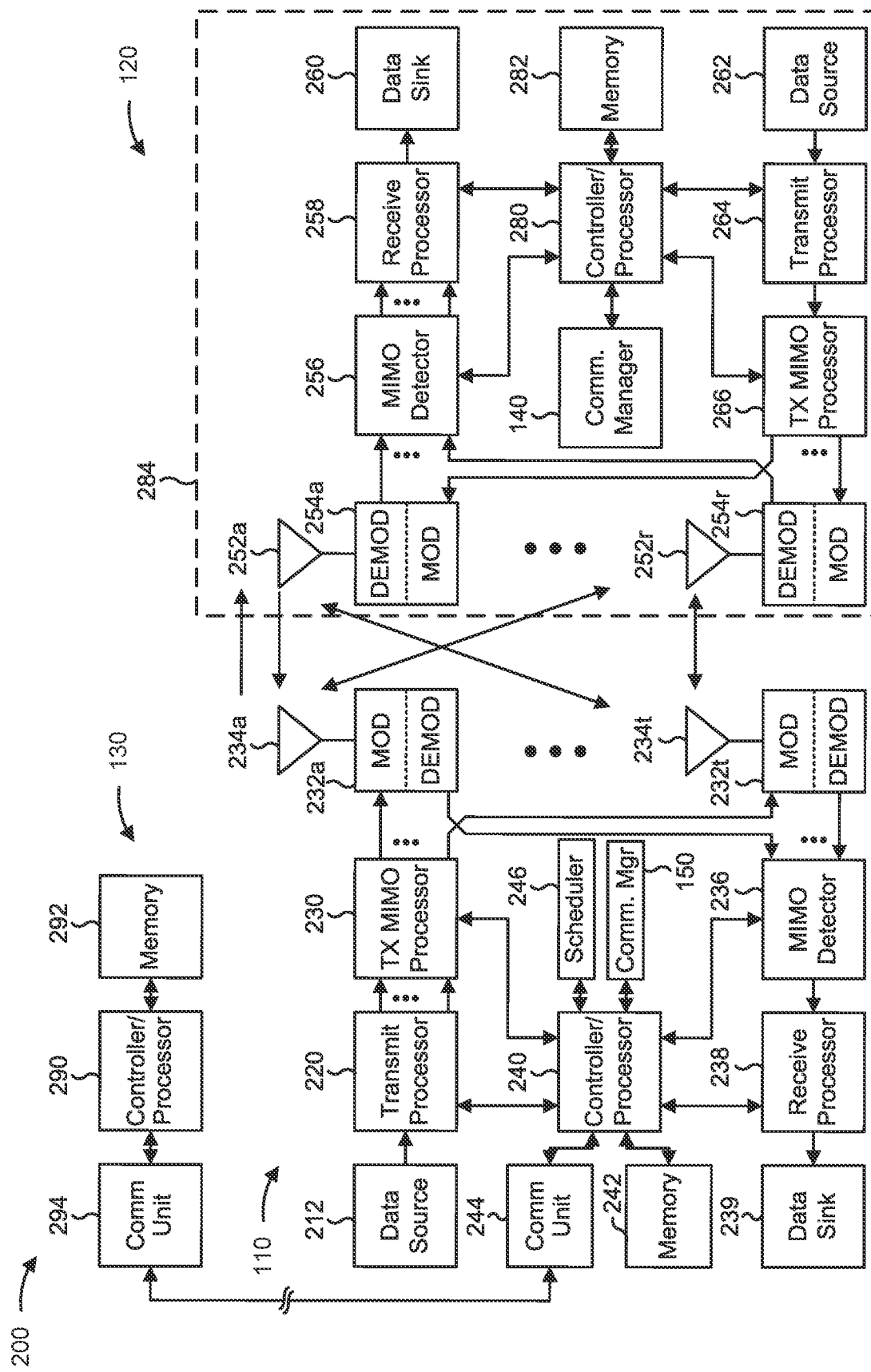
FIG. 2 is a diagram illustrating an example of a base station in communication with UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s)

selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with adaptive non-uniform constellation operation, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 9, process and/or other processes as described herein. In some examples, executing instructions may include running the instructions, converting the instructions, compiling the instructions, and/or interpreting the instructions, among other examples.

In some aspects, the UE (e.g., the UE 120) includes means for receiving or transmitting constellation information that indicates a modulation constellation type associated with a wireless communication, the constellation information indicating, as the modulation constellation type, a UC type or a NUC type; and/or means for transmitting or receiving the wireless communication based at least in part on the modulation constellation type. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station (e.g., the BS 110) includes means for transmitting or receiving constellation information that indicates a modulation constellation type associated with a wireless communication, the constellation information indicating, as the modulation constellation type, a UC type or a NUC type; and/or means for receiving or transmitting the wireless communication based at least in part on the modulation constellation type. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3D are diagrams illustrating examples 300, 302, 304, and 306 of symbol constellation diagrams, in accordance with the present disclosure. A constellation diagram is a representation of a signal modulated by a digital modulation scheme, such as binary phase shift keying (BPSK), π/2 BPSK, quadrature phase shift keying (QPSK), and/or quadrature amplitude modulation (QAM) (such as 16-QAM, 64-QAM, 128-QAM, and/or 256-QAM). A constellation diagram illustrates a signal as a two-dimensional scatter diagram with an x axis (e.g., a horizontal real axis representing an in-phase carrier, shown as an I component) and a y axis (e.g., a vertical imaginary axis representing a quadrature carrier, shown as a Q component). The angle of a constellation point, measured counterclockwise from the horizontal axis, represents a phase shift of a carrier wave from a reference phase. The distance to a constellation point, measured from the origin, represents the amplitude or power of the signal.

In a digital modulation system, information is transmitted as a series of samples, where each sample occupies a respective time period. During each sample, the carrier wave has a constant amplitude and phase value that is restricted to one of a finite number of values. Thus, each sample encodes one of a finite number of symbols, which in turn represent one or more binary digits (bits) of information. Each symbol is encoded as a combination of amplitude and phase of the carrier, and each symbol is represented by a point on the constellation diagram, called a constellation point. The constellation diagram shows all the possible symbols that can be transmitted by the system as a collection of points. During demodulation, a demodulator identifies a constellation point with a highest likelihood of corresponding to a received signal (e.g., a received sample) and recovers binary digits based at least in part on the symbol associated with the identified constellation point.

Some digital modulation/demodulation schemes define and/or use symbols that have uniform spacing between one another on a constellation diagram (e.g., uniform I and Q spacing), which may be referred to as a uniform constellation (UC). To illustrate, the example 300 of FIG. 3A depicts a constellation diagram for 64-QAM with uniform spacing between symbols (e.g., a same distance between every pair of adjacent symbols that are nearest to one another in the constellation diagram). As shown by the example 300, a first symbol 308 and a second symbol 310 have a same Q-component value (e.g., are located a same distance from the origin along the Q-component axis) and are separated by a distance 312 along the I-component axis (e.g., a Euclidean distance). The first symbol 308 and a third symbol 314 have a same I-component value (e.g., are located a same distance from the origin along the I-component axis) and are separated by a distance 316 along the Q-component axis, where the distance 312 and the distance 316 are uniform in length (e.g., have a same size). The distance 310 and the distance 314 are also equal to all other distances between symbols in a pair of adjacent symbols in the constellation diagram, such as a distance between the second symbol 308 and a fourth symbol 316, a distance between the third symbol 312 and the fourth symbol 316, and so on. Thus, the different combinations of amplitude and phase of the carrier for each symbol of the example 300 result in uniformly spaced symbols on the constellation diagram.

Some digital modulation/demodulation schemes define and/or use symbols that have non-uniform spacing between one another (e.g., non-uniform I and Q spacing), also referred to as an NUC. In some aspects, an NUC may provide improved performance, such as fewer bit errors at a receiver, larger mutual information (e.g., a measure of correlation and/or accuracy between transmitted information and recovered information), improved peak-to-average-power ratio (PAPR), and/or better resistance to phase noise, relative to a UC for particular channel and/or operating conditions. For example, a first digital modulation scheme that uses symbols corresponding to an NUC may provide improved performance relative to a second digital modulation scheme that uses symbols corresponding to a UC for a particular signal-to-noise ratio (SNR). Optimal non-uniform spacing between the symbols (e.g., spacings that minimize recovery errors at a receiver and/or improve performance relative to other spacings) may vary based on current channel and/or operating conditions that may be identified by a variety of signal-quality and/or link-quality measurements (e.g., SNR, RSRP, RSSI, RSRQ, and/or CQI). Thus, the optimal carrier amplitude and phase combinations used to define symbols may vary based at least in part on the channel and/or operating conditions.

Figure 3B:
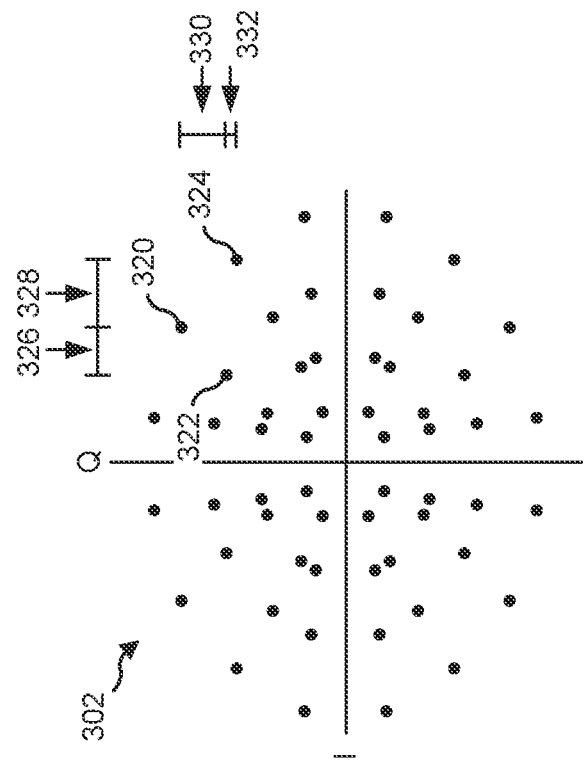
FIGS. 3A-3D are diagrams illustrating examples of symbol constellation diagrams, in accordance with the present disclosure.
Figure 3A:
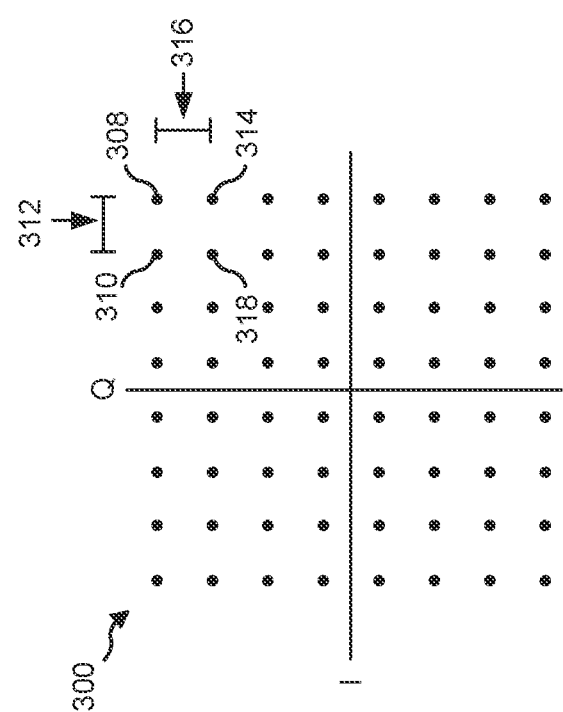

The example 302 of FIG. 3B depicts a first NUC diagram for 64-QAM, where the corresponding digital modulation/demodulation scheme optimizes symbol definitions based at least in part on a first SNR of 10 decibels (dB). A first symbol 320 shown by the constellation diagram of the example 302 may be considered adjacent to a second symbol 322 and a third symbol 324 diagram because the second symbol 322 and the third symbol 324 are closer to the first symbol 320 relative to other symbols. As shown by the example 302, the first symbol 320, the second symbol 322, and the third symbol 324 have non-uniform spacing along both the I-component axis and Q-component axis relative to one another. For example, the first symbol 320 is separated from the second symbol 322 by a distance 326 along the I-component axis, and is separated from the third symbol 324 by a distance 328 along the I-component axis. The distance 326 and the distance 328 are non-uniform (e.g., have different lengths). Similarly, and with regard to the Q-component axis, the first symbol 320 is separated from the second symbol 322 by a distance 330, and is separated from the third symbol 324 by a distance 332. The distance 330 and the distance 332 are non-uniform in length relative to one another. In aspects, the non-uniform spacing between the symbols (e.g., defined by the various combinations of carrier amplitude and phase) shown by the example 302 may reduce recovery errors at a receiver relative to the uniform spacing shown by the example 300 when used under 10 dB SNR channel conditions.

Figure 3D:
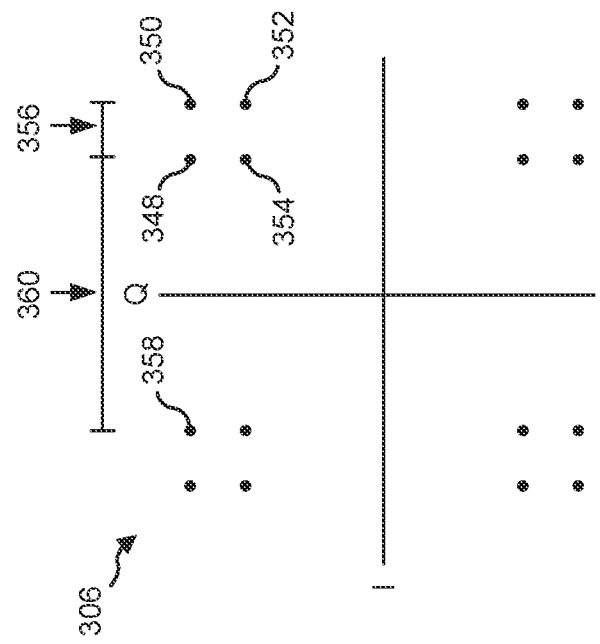
Figure 3C:
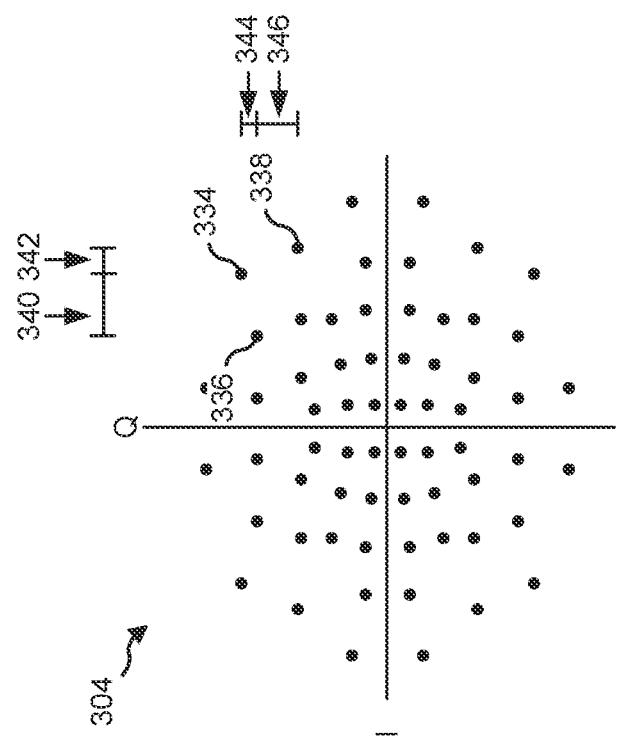

The example 304 of FIG. 3C depicts a second NUC diagram for 64-QAM, where the corresponding digital modulation/demodulation scheme optimizes symbol spacing based at least in part on a second SNR of 15 dB. A first symbol 334 may be considered adjacent to a second symbol 336 and a third symbol 338 because as the symbol 336 and the symbol 338 are closer to the symbol 334 relative to other symbols. Similar to the example 302, the first symbol 334, the second symbol 336 and the third symbol 338 shown by the example 304 have non-uniform spacing along both the I-component axis and Q-component axis. For example, the first symbol 334 is separated from the second symbol 336 by a distance 340 along the I-component axis, while the first symbol 334 is separated from the third symbol 338 by a distance 342. The distance 340 and the distance 342 are non-uniform in length relative to one another. With regard to the Q-component axis, the first symbol 334 is separated from the second symbol 336 by a distance 344 and is separated from the third symbol 338 by a distance 346. The distance 344 and the distance 346 are non-uniform in length relative to one another. In aspects, the non-uniform spacing between the symbols (e.g., defined by the various combinations of carrier amplitude and phase) shown by the example 304 may reduce recovery errors at a receiver relative to the uniform spacing shown by the example 300 and the non-uniform spacing shown by the example 302 when used under 15 dB SNR channel conditions.

NUC diagrams may be classified as one-dimensional (1D) NUCs or two-dimensional (2D) NUCs. Similar to the UC diagram shown by the example 300, a 1D NUC maps and/or maintains symbols in a rectangular and/or square shape. However, a 1D NUC uses non-uniform spacing between at least some of the symbols. A 2D NUC maps symbols using patterns and/or shapes that are not rectangular and/or square shapes, such as the 2D NUCs shown by the example 302 and the example 304.

The example 306 of FIG. 3D depicts a 1D NUC diagram for 16-QAM. The symbols 348, 350, 352, and 354 form a first grouping of symbols in a first quadrant (e.g., an upper-right quadrant) that form a rectangular shape (shown as a square in FIG. 3D), and each additional quadrant of the NUC shown by the example 306 includes a mirrored grouping of symbols in accordance with the respective quadrant (e.g., mirrored vertically, mirrored horizontally, and/or mirrored vertically and horizontally). The symbols of a 1D NUC form a rectangular shape within each quadrant. Similarly, when considered in entirety across all quadrants, the symbols of an 1D NUC form a rectangular shape. However, at least some adjacent symbols (e.g., adjacent symbols within a quadrant and/or adjacent symbols across quadrants) have non-uniform spacing between one another. To illustrate, the symbol 348 and the symbol 350 are separated along the I-component axis by a distance 356. Mirrored symbol 358 may be considered adjacent to the symbol 348 because no other symbols are positioned between the symbol 348 and the symbol 358. The symbol 358 and the symbol 348 are separated along the I-component axis by a distance 360, which is non-uniform with the distance 356. While the example 306 shows the symbols 348, 350, 352, and 354 having uniform spacing between one another, other examples of 1D NUC types may have non-uniform spacing between symbols that reside in a same quadrant (but form a rectangle within the quadrant and/or in entirety with all symbols across all quadrants).

Thus, a uniform constellation may have uniform spacing between every pair of adjacent symbols that are nearest to one another in the constellation diagram, may have uniform spacing between consecutive symbols along the Q-component axis (e.g., a pair of symbols along a line parallel to the Q-component axis with no intervening symbols along that line), and may have uniform spacing between consecutive symbols along the I-component axis (e.g., a pair of symbols along a line parallel to the I-component axis with no intervening symbols along that line), including consecutive and/or adjacent symbols across quadrants. As described above in connection with a 1D NUC, in some aspects, a non-uniform constellation may have symbols that, when considered in entirety across all quadrants, have a rectangular shape. Provided that at least some symbols within the non-uniform constellation have non-uniform spacing between one another (e.g., either adjacent or consecutive). Thus, the spacing between adjacent symbols within a quadrant may be uniform or non-uniform. Similarly, consecutive symbols may have uniform or non-uniform spacing along the Q-component axis and/or along the I-component axis. A 2D NUC may have any combination of uniform and/or non-uniform spacing between adjacent and consecutive symbols. The symbols of a 2D NUC, when considered in entirety across quadrants, do not form a rectangular shape.

A modulation constellation type, such as an NUC type (which may be a 1D NUC type or 2D NUC type) or a UC type, denotes a particular constellation diagram that defines a particular number of symbols using a particular pattern. For example, a 16-QAM UC may be a first UC type, a 64-QAM UC may be a second UC type, and so forth. A 16-QAM 1D NUC may be a first NUC type, a 16-QAM 2D NUC may be a second NUC type, and so forth. At times, a modulation constellation type may specify a modulation order (e.g., 16-QAM or 64-QAM), but other times a modulation constellation type omits modulation order information.

Some digital modulation schemes, such as M-ary QAM shown by the examples 300, 302, and 304 as 64-QAM (M=64), can improve a spectral efficiency of digital transmissions (sometimes referred to as bit per second per Hertz (bps/Hz)) relative to other modulation techniques by increasing data rates for a particular bandwidth. To illustrate, M-ary QAM maps n bits to one of M available signals (e.g., carrier amplitude and phase), where M=2n and M and n are integers. Thus, 64-QAM uses 64 available signals to represent combinations of 6 bits (e.g., 000000, 101010, 111111, and so forth). As another example, bit interleaved coded modulation (BICM) interleaves data prior to mapping the data to symbols, which changes an ordering of continuous data. Interleaving spreads the continuous data packet across a transmission and reduces the susceptibility to errors introduced by burst-y traffic or Rayleigh fading.

The Shannon capacity and/or the Shannon limit defines a theoretical maximum transmission rate and/or amount of information that can be reliably transmitted over a communication channel based at least in part on an amount of noise present in the communication channel and/or operating environment. Thus, the theoretical maximum transmission rate decreases (or increases) as the noise in the communication channel increases (or decreases). For example, for a communication channel with low noise (e.g., 25 dB SNR), UC 16-QAM can provide improved spectral efficiency relative to UC 4-QAM. However, added noise to the operating environment reduces the efficacy of UC 16-QAM. To illustrate, 16-QAM may have a same efficacy as 4-QAM for a communication channel that has a 5 dB SNR based at least in part on increased data errors at a receiver introduced by the noisy environment.

Various factors affect noise in a communication channel, such as a number of UEs operating in the wireless network, a UE location, an operating frequency, mobility of the UE, and so forth. While digital modulation schemes such as 64-QAM using a UC and bit interleaving can improve spectral efficiency for particular operating environments (e.g., with low noise), the noise in the operating environment may change and reduce the efficacy of these schemes, which can reduce data throughput, increase data-transfer latencies, and/or reduce a quantity of devices supportable by a wireless communication network. Thus, wireless communication networks benefit from techniques to achieve the Shannon capacity and/or reduce a gap between system performance and the Shannon capacity.

Some techniques and apparatuses described herein provide adaptive non-uniform constellation operation. Adaptive non-uniform constellation operation enables a base station and/or a UE to select a modulation constellation type (e.g., a digital modulation scheme that defines symbols using a particular constellation diagram) that reduces recovery errors at a receiver and/or improves data throughput relative to other modulation constellation types, such as by selecting an NUC with improved data recovery performance relative to a UC (or vice versa). To illustrate, the base station and/or UE may select the modulation constellation type based at least in part on a current operating environment, such as by selecting an M-ary NUC with improved performance for the current operating environment relative to an M-ary UC. In some aspects, the base station may configure a UE to switch from communicating with the base station using a first modulation constellation type (e.g., from a UC or an NUC) to communicating with the base station using a second modulation constellation type (e.g., to an NUC or a UC). Alternatively or additionally, the UE may communicate a modulation constellation type to the base station. Adaptive non-uniform constellation operation enables the base station and/or UE to modify modulation constellation types and/or digital modulation schemes as operating conditions change. Dynamically modifying a modulation constellation type associated with processing digital communications (e.g., modulating and/or demodulating) improves the efficacy and/or spectral efficiency of the digital communications (e.g., closes a gap between a performance of the wireless communication network and the theoretical Shannon capacity), which improves data throughput, reduces data-transfer latencies, and/or increases a quantity of devices supportable by a wireless communication network. The phrase "digital modulation scheme" may refer to a digital modulation scheme at a transmitting device and/or a reciprocal digital demodulation scheme at a receiving device, unless explicitly stated otherwise.

In some aspects, a base station transmits or receives constellation information that indicates a modulation constellation type associated with a wireless communication, where the constellation information indicates, as the modulation constellation type, a UC type or an NUC type. To illustrate, the base station may transmit the constellation information to the UE, where the constellation information indicates a first modulation constellation type for downlink (DL) communications. Alternatively or additionally, the base station may receive constellation information from the UE, where the constellation information indicates a second modulation constellation type for uplink (UL) communications. Based at least in part on transmitting or receiving the constellation information, the base station receives or transmits the wireless communication based at least in part on the modulation constellation type.

In some aspects, a UE receives or transmits constellation information that indicates a modulation constellation type associated with a wireless communication, where the constellation information indicates, as the modulation constellation type, a UC type or an NUC type. The UE may receive the constellation information from a base station and/or the UE may transmit the constellation information to the base station. Based at least in part on receiving or transmitting the constellation information, the UE transmits or receives the wireless communication based at least in part on the modulation constellation type.

As indicated above, FIGS. 3A-3D are provided as examples. Other examples may differ from what is described with regard to FIGS. 3A-3D.

Figure 4:
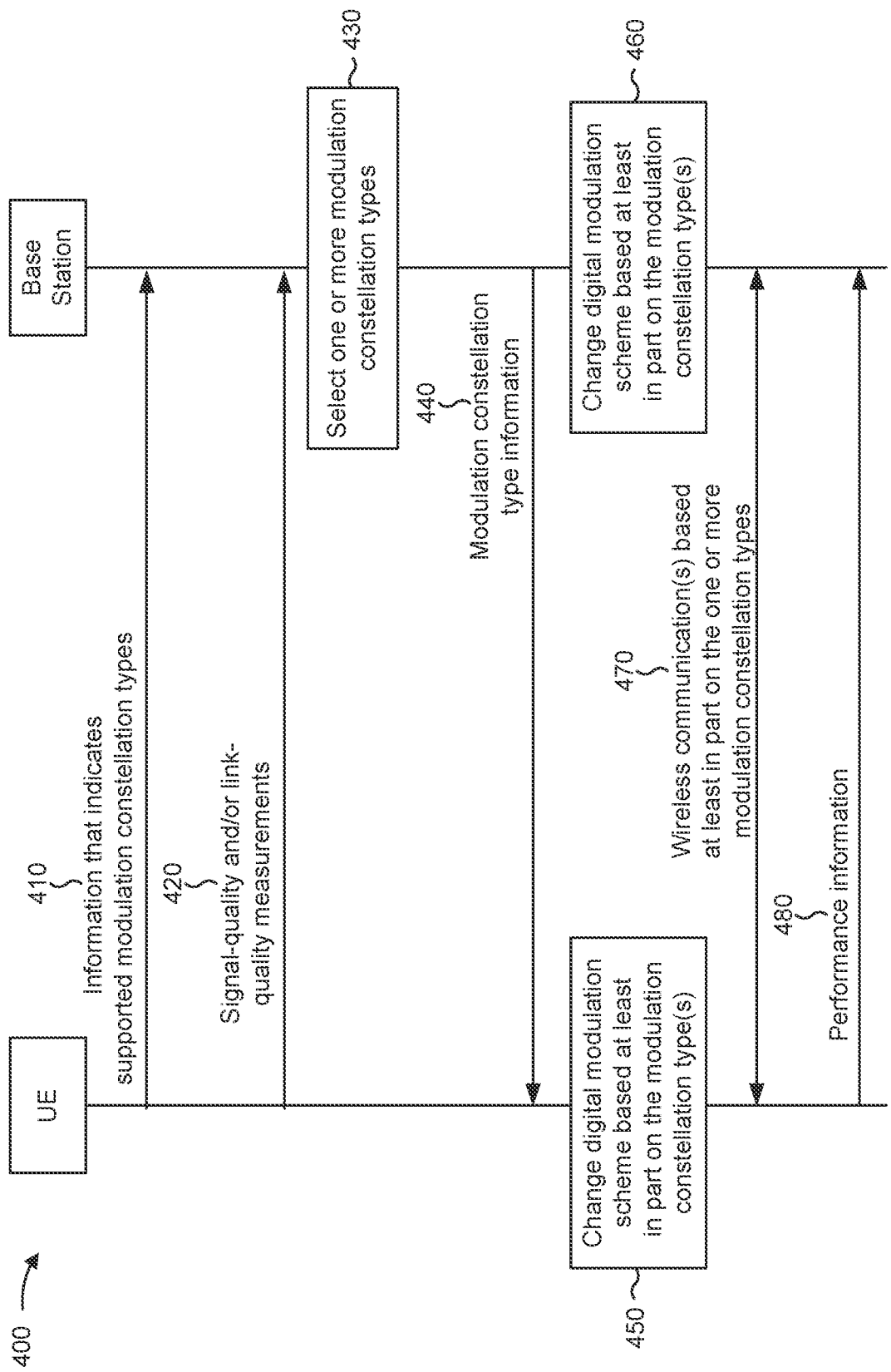
FIG. 4 is a diagram illustrating an example of adaptive non-uniform constellation operation, in accordance with the present disclosure.

FIG. 4 is a diagram illustrating an example 400 of adaptive non-uniform constellation operation, in accordance with the present disclosure. The example 400 includes a UE (e.g., UE 120 and/or apparatus 900 described in connection with FIG. 9) and a base station (e.g., BS 110 and/or apparatus 1000 described in connection with FIG. 10). In example 400, the base station selects one or more modulation constellation types for communication with the UE.

As shown by reference number 410, the UE may transmit, and the base station may receive, information (sometimes called "UE capability information") that indicates one or more supported modulation constellation types, such as an NUC type and/or a UC type. As one example, the UE transmits a UECapabilityInformation information element (IE) to the base station as part of a registration process and/or in response to a query from the base station (not shown in FIG. 4), where the UECapabilityInformation IE indicates the supported modulation constellation types, such as through a toggle field, a Boolean value, an IE, and/or an enumerated value (e.g., enum) explicitly associated with a particular NUC type and/or UC type. In some aspects, the UE implicitly indicates unsupported modulation constellation types, such as by omitting an enumerated value, a toggle field, an IE, and/or a Boolean value explicitly associated with each unsupported modulation constellation type from the UECapabilityInformation IE.

In some aspects, the UE capability information indicates, as part of the supported modulation constellation types, supported modulation orders and/or supported NUC dimensions (e.g., 1D, 2D). To illustrate, the UE capability information may indicate that the UE supports 1D NUC for 64-QAM, 2D NUC for 16-QAM, and UC for 256-QAM. However, in other aspects, the UE capability information omits the modulation order and/or the NUC dimensions. To illustrate, the UE capability information may only indicate that the UE supports modulating and/or demodulating communications using a UC and/or an NUC, without indicating a modulation order and/or a NUC dimension. Alternatively or additionally, the UE capability information may indicate whether the UE supports MCS tables that include modulation constellation type information, as further described with regard to FIG. 6. To illustrate, the UE capability information may include explicit information that specifies particular MCS tables (e.g., that include modulation constellation information) supported by the UE, or the UE capability information may implicitly indicate that the UE supports MCS tables that include modulation constellation type information based at least on part on indicating that the UE supports an NUC type.

As shown by reference number 420, the UE may transmit, and the base station may receive, one or more signal-quality and/or link-quality measurements. To illustrate, the UE may generate any combination of SNR, RSRP, RSSI, RSRQ, and/or CQI metrics from communications and/or reference signals transmitted by the base station and/or other UEs (not shown in FIG. 4). Based at least in part on generating the signal-quality and/or link-quality measurements, the UE may transmit the measurements to the base station. In some aspects, the UE transmits the measurements periodically or based at least in part on identifying a trigger event (e.g., based at least in part on SNR changing more than a threshold value, and/or based at least in part on receiving a query from the base station).

As shown by reference number 430, the base station may select one or more modulation constellation types for a wireless communication between the base station and the UE, such as one or more NUC types and/or one or more UC types. In some aspects, the base station may select the modulation constellation type based at least in part on supported modulation constellation types indicated by the UE and shown by the reference number 410. To illustrate, the base station may select a 1D NUC type based at least in part on the UE capability information indicating that the UE supports a 1D NUC type. As another example, the base station may select a modulation constellation type without receiving UE capability information from the UE. In some aspects, the base station selects a modulation constellation type for any combination of a downlink communication, an uplink communication, a side-link communication (e.g., between UEs), and/or non-orthogonal multiple-access (NOMA) communications in licensed or unlicensed spectrum.

Alternatively or additionally, the base station may select the modulation constellation type based at least in part on signal-quality and/or link-quality measurements received from the UE (as shown by the reference number 420) and/or generated by the base station (not shown in FIG. 4). To illustrate, based on an SNR metric that indicates a current operating condition of a communication channel between the base station and the UE, the base station may select, as the modulation constellation type, an NUC type that provides better performance relative to a UC type for the current operating condition. In some aspects, the base station selects the modulation constellation type without receiving signal-quality and/or link-quality measurements from the UE and/or generating signal-quality and/or link-quality measurements.

In some aspects, the base station may select multiple modulation constellation types for different portions of the wireless communication, such as layer-specific modulation constellation types or frequency-specific modulation constellation types. To illustrate, a downlink beam may be at least partially defined by a transmission configuration indicator (TCI) state that indicates a directionality and/or characteristic of the downlink beam. In some cases, multiple downlink beams may be used for communications between the base station and the UE, where each downlink beam has a different TCI state. A first active downlink beam, for instance, may be configured and/or used for both control (e.g., a physical downlink control channel (PDCCH)) and data (e.g., a physical downlink shared channel (PDSCH)) and a second active downlink beam may be configured and/or used only for control (and not data). The first and second downlink beams may have different TCI states and, subsequently, may have different communication channel characteristics (e.g., SNR). To reduce recovery errors at a receiver, the base station may select layer-specific modulation constellation types, such as a first modulation constellation type for a first layer (e.g., a first downlink beam with a first TCI state and/or first layer of a multi-layer communication, such as a MIMO layer) of the downlink communication and a second modulation constellation type for a second layer (e.g., a second downlink beam with a second TCI state or a second layer of a multi-layer communication) of the downlink communication, based at least in part on the respective TCI states of the downlink beams.

In some aspects, a TCI state may be associated with a demodulation reference signal (DMRS), a DMRS port (e.g., an antenna port), and/or a code division multiplexing (CDM) group, where a CDM group may be considered a group of DMRS ports that are code division multiplexed in the time-frequency domain. For a communication system that supports multiple DMRS ports, a DMRS position in the frequency domain may differ for each DMRS port, which may result in different communication channel characteristics for the different DMRS transmissions. A base station may select layer-specific modulation constellation types based at least in part on the DMRS ports and/or CDM groups associated with the multi-layered DMRS transmission. To illustrate, the base station may select a layer-specific modulation constellation type based at least in part on a particular DMRS, DMRS port, and/or CDM group associated with the particular layer.

Alternatively or additionally, the base station may select frequency-specific modulation constellation types, such as a first modulation constellation type for a first frequency partition used for a wireless communication and a second modulation constellation type for a second frequency partition used for the wireless communication. To illustrate, different resource blocks (RBs), resource block groups (RBGs), and/or sub-bands of a transmission may experience different channel distortions from one another, such as based at least in part on multiple transmit receive point (multi-TRP) frequency division multiplexing (FDM) schemes. In some aspects, the base station may select frequency-specific modulation constellation types for different RBs, RBGs, and/or sub-bands of a wireless communication (e.g., a wireless communication associated with multi-TRP FDM transmissions). For example, the base station may select a first modulation constellation type for a first frequency region (e.g., a first RB, a first RBG, and/or a first sub-band), and a second modulation constellation type for a second frequency region (a second RB, a second RBG, and/or a second sub-band).

In selecting a modulation constellation type, the base station may select a modulation constellation type that is different from a prior modulation constellation type (e.g., previously selected by the base station for the UE and/or previously used for communications between the base station and the UE). The base station, for instance, may initially modulate (and the UE may demodulate) DL communications based at least in part on an initial modulation constellation type (e.g., a UC type or an NUC type). The base station may subsequently select a second modulation constellation type that differs from the initial modulation type and/or theoretically improves performance of transmitting and recovering the wireless communication, such as selecting a NUC type or UC type that differs from the initial modulation constellation type. As one example, the base station may select the second, different modulation constellation type based at least in part on observing and/or measuring changes in the communication channel. Similarly, the base station may initially demodulate (and the UE may modulate) UL communications based at least in part on the initial modulation type and subsequently select a different modulation constellation type for subsequent UL communications. Thus, in selecting the modulation constellation type, the base station may select a modulation constellation type that differs from prior modulation constellation types.

In some aspects, the base station selects the one or more constellation types based at least in part on transmission times. To illustrate, the base station may select a first modulation constellation type for a first transmission scheduled to occur over a first time duration, a second modulation constellation type for a second transmission scheduled to occur over a second time duration, and/or a third modulation constellation type for transmissions without assigned time slots (e.g., a random access channel (RACH) transmission). As one example, the base station may select different modulation constellation types for different transmission instances of PDCCH repetitions.

At times, the base station may select at least a first modulation constellation type for an initial transmission of a communication and a second modulation constellation type for a retransmission of the communication. As one example, the base station may receive, for a hybrid automatic repeat request (HARQ) process, acknowledge/not acknowledged (ACK/NACK) feedback that indicates that the UE failed to recover a communication from an initial transmission that used a first modulation constellation type. In response to receiving the ACK/NACK feedback (or other forms of HARQ feedback), the base station may select a second modulation constellation type for a retransmission of the communication. To illustrate, the initial transmission of the communication may be based on a default modulation constellation type (e.g., a UC type supported by all devices capable of accessing the wireless network) and the retransmission of the communication may be based on a second modulation constellation type (e.g., an NUC type) with improved performance for a current operating condition (e.g., SNR) relative to the default modulation constellation type.

Although not shown in FIG. 4, the UE may alternatively or additionally select a modulation constellation type and indicate the UE-selected modulation constellation type to the base station, as further described below with reference to FIG. 5. In some aspects, the UE may recommend (e.g., indicate to the base station) the UE-selected modulation constellation type such that the UE refrains from using the UE-selected modulation constellation type until receiving confirmation from the base station. In other aspects, the UE begins using the UE-selected modulation constellation type for communications without waiting for confirmation from the base station. The UE, for instance, may implicitly expect the base station to use the UE-selected modulation constellation type for communications (e.g., without receiving a confirmation) based at least in part on the UE indicating the UE-selected modulation constellation type to the base station.

As shown by reference number 440, the base station may transmit, and the UE may receive, modulation constellation type information, such as information that indicates one or more modulation constellation types selected by the base station (e.g., as described above in connection with reference number 430). To illustrate, the base station may transmit the modulation constellation type information in a radio resource control (RRC) configuration message, an RRC reconfiguration message, downlink control information (DCI), and/or a medium access control (MAC) control element (CE).

In some aspects, and as part of transmitting the modulation constellation type information, the base station may configure and/or instructs the UE to activate a particular MCS table, such as an MCS table that includes modulation constellation type information, as further described with regard to FIG. 6. Alternatively or additionally, the base station may configure and/or instruct the UE to activate a particular MCS table that omits explicit modulation constellation type information, but has an association with a particular modulation constellation type. Thus, a particular modulation constellation type can be implicitly indicated by a particular MCS table. Activating an MCS table denotes making the MCS table a current and/or valid MCS table for determining modulation and coding schemes of a transmission (e.g., and subsequently using the activated MCS table to determine modulation and coding schemes of a transmission). Deactivating the MCS table denotes making the MCS table invalid for determining modulation and coding schemes of the transmissions (e.g., and subsequently refraining from using the deactivated MCS table to determine modulation and coding schemes of a transmission). In some aspects, the base station may instruct the UE to deactivate a current and/or prior MCS table, which may include or exclude modulation constellation type information. For instance, the base station may transmit an indication to deactivate a first MCS table and/or to activate a second MCS table using a field in DCI, in a medium access control (MAC) control element (CE), in an RRC configuration message, and/or in an RRC reconfiguration message. The base station may also indicate an index value that maps to an entry in an MCS table, using the DCI, the MAC CE, the RRC configuration message, and/or the RRC reconfiguration message.

As shown by reference number 450, the UE may change (e.g., activate and/or deactivate) a digital modulation scheme based at least in part on the modulation constellation type(s) received and shown by the reference number 440. Similarly, and as shown by the reference number 460, the base station may change (e.g., activate and/or deactivate) a digital modulation scheme based at least in part on the modulation constellation type(s). In some aspects, the UE and/or the base station may identify that a current modulation constellation type and a modulation constellation type indicated by the modulation constellation type information are equivalent and, for efficiency, retain the current modulation constellation type instead of performing processing that changes the digital modulation scheme.

As one example, the UE may change a digital modulation scheme (and the base station may change a digital demodulation scheme) for processing UL communications based at least in part on an UL modulation constellation type indicated by the modulation constellation type information. Alternatively or additionally, the UE may change a digital demodulation scheme (and the base station may change a digital modulation scheme) for processing DL communications based at least in part on a DL modulation constellation type indicated by the modulation constellation type information. The UL modulation constellation type and/or the DL modulation constellation type may be based at least in part on layer-specific and/or frequency-specific modulation constellation types as further described.

As shown by reference number 470, the base station may transmit or receive, and the UE may respectively receive or transmit, a wireless communication based at least in part on the one or more modulation constellation types. As one example, the base station and the UE may process the wireless communication using a digital modulation/demodulation scheme that is based at least in part on the one or more modulation constellation types.

As shown by reference number 480, the UE may transmit performance information to the base station. As one example, the UE may transmit performance information for a first modulation constellation type used for an initial transmission of a communication and for a second modulation constellation type used for a retransmission of the communication (e.g., for a HARQ process). To illustrate, the UE may transmit, as part of the performance information, a bit error rate (BER) metric and/or a block error rate (BLER) metric for the transmission and retransmission. However, the UE may alternatively or additionally transmit a variety of signal-quality and/or link-quality measurements as the performance information, such as SNR, RSSI, RSPR, and so forth. By selecting different modulation constellation types, a base station may configure a UE to process wireless communications using digital modulation schemes that mitigate recover errors at a receiver and improve data throughput relative to other digital modulation schemes.

As indicated above, FIG. 4 is provided as an example. Other examples may differ from what is described with regard to FIG. 4.

Figure 5:
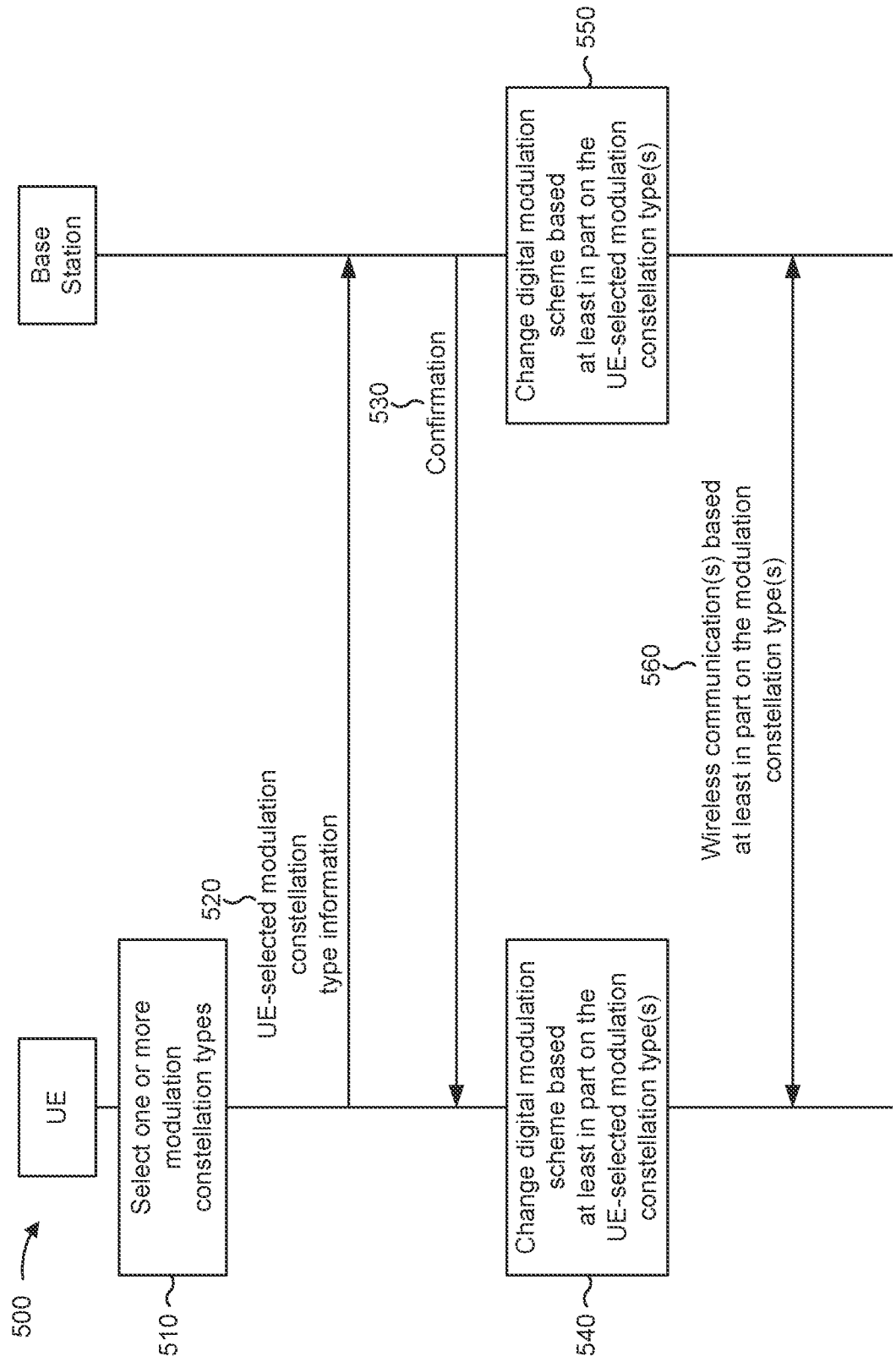
FIG. 5 is a diagram illustrating an example of adaptive non-uniform constellation operation, in accordance with the present disclosure.

FIG. 5 is a diagram illustrating an example 500 of adaptive non-uniform constellation operation, in accordance with the present disclosure. The example 500 includes a UE (e.g., UE 120 and/or apparatus 900 described in connection with FIG. 9) and a base station (e.g., BS 110 and/or apparatus 1000 described in connection with FIG. 10). In some aspects, one or more communications and/or operations shown by the example 500 may be combined with one or more communications and/or operations shown by the example 400. In example 500, the UE selects a modulation constellation type for communication with the base station.

As shown by reference number 510, a UE may autonomously select one or more modulation constellation types.

As one example, the UE may observe and/or measure distortion in a signal that is introduced by transceiver hardware at the UE, such as phase noise. In some aspects, the UE may observe an impact of the phase noise (e.g., the distortion added by the phase noise) more in signals with a high SNR relative to other signals. Thus, the UE may select a modulation constellation type that reduces recovery errors and/or mitigates the phase noise. For instance, the UE may initially process communications (e.g., by performing modulation or demodulation) based at least in part on a UC type, either by default or by receiving information from the base station that configures the UE to use the UC type. Based at least in part on measured distortion and/or metrics that fall below a performance threshold (e.g., BER or BLER), the UE may subsequently select an NUC type.

In some aspects, the UE selects multiple modulation constellation types, such as a first modulation constellation type for processing UL communications to the base station and/or a second modulation constellation type for processing DL communications from the base station. Alternatively or additionally, the UE may select modulation orders associated with the modulation constellation types, such as by selecting a first modulation order for an NUC type (e.g., 64-QAM 1D or 2D NUC) and a second modulation for a UC type (e.g., 16-QAM UC).

The UE may select a modulation constellation type based at least in part on any combination of information, such as a carrier frequency, an SNR metric, and/or a sub-carrier spacing (SCS) associated with transmitting or receiving a wireless communication. For example, and in a similar manner as described with regard to FIG. 4 and shown by reference number 430, the UE may select the modulation constellation type based at least in part on UE-supported NUCs, signal-quality and/or link-quality measurements, frequency partitioning, and/or layer partitioning.

In some aspects, the UE selects the modulation constellation type from a set of pre-configured modulation constellation types. A pre-configured modulation constellation type may be a particular modulation constellation type that has a shared and/or common definition between at least two devices. To illustrate, the base station may signal the set of pre-configured constellation types to the UE using an RRC message and/or a MAC CE (not shown in FIG. 5), such as by indicating that a first modulation constellation type out of the set corresponds to 16-QAM 1D NUC, a second modulation constellation type out of the set corresponds to 64-QAM UC, a third modulation constellation type out of the set corresponds to 64-QAM 2D NUC, and so forth. In some aspects, the UE selects the modulation constellation type from the set of pre-configured modulation constellation types. While the example pre-configured modulation constellation types each indicate a modulation order, other examples of pre-configured modulation constellation types may omit the modulation order from the definitions.

As shown by reference number 520, the UE may transmit, and the base station may receive, UE-selected modulation constellation type information, which may indicate multiple UE-selected modulation constellation types. As one example, the UE may transmit the UE-selected modulation constellation type information in a field within uplink control information (UCI) and/or a MAC CE, such as an index value that points to a particular pre-configured modulation constellation type out of a set and/or that maps to an entry in an MCS table. As another example, the UE may transmit a UL DMRS sequence that maps to the particular pre-configured modulation constellation type. As yet another example, the UE may transmit a guard interval (GI)

sequence that maps to the particular pre-configured modulation constellation type. In some aspects, the UE may transmit the UE-selected modulation constellation information in an RRC message.

As shown by reference number 530, the base station may transmit a confirmation to the UE that indicates that the base station has received the UE-selected modulation constellation type and will begin using the UE-selected modulation constellation type. For example, the base station may transmit a DRMS that maps to the confirmation. However, in other aspects, the base station does not transmit a confirmation to the UE.

As shown by reference number 540, the UE may change (e.g., activate and/or deactivate) a digital modulation scheme based at least in part on the UE-selected modulation constellation type. Similarly, as shown by reference number 550, the base station may change (e.g., activate and/or deactivate) a digital modulation scheme based at least in part on the UE-selected modulation constellation type. In some aspects, the UE and/or the base station may identify that a current modulation constellation type and a modulation constellation type indicated by the information are equivalent and, for efficiency, retain the current modulation constellation type instead of performing processing that changes the digital modulation scheme.

As one example, the UE may change a digital modulation scheme used for transmitting UL communications to the base station based at least in part on a UE-selected modulation constellation type, and the base station may change a digital demodulation scheme for recovering the UL communications based at least in part on the UE-selected modulation constellation type. Alternatively or additionally, the UE may change a digital demodulation scheme used for recovering DL communications from the base station based at least in part on the UE-selected modulation constellation type indicated by the information, and the base station may change a digital modulation scheme for transmitting the DL communications based at least in part on the UE-selected modulation constellation type.

As shown by reference number 560, the base station may transmit or receive, and the UE may respectively receive or transmit, a wireless communication based at least in part on the UE-selected modulation constellation type. In some aspects, as part of receiving or transmitting the wireless communication, the UE accesses an MCS table that omits modulation constellation information and determines to use the UE-selected modulation constellation type based at least in part on transmitting the information as shown by reference number 520. By selecting different modulation constellation types, a UE may configure a base station to process wireless communications using digital modulation schemes that mitigate recover errors at a receiver and improve data throughput relative to other digital modulation schemes and/or digital modulation schemes selected by the base station. To illustrate, the UE may select a modulation constellation type based at least in part on signal distortion measured by the UE, where the signal distortion may be unknown to the base station.

As indicated above, FIG. 5 is provided as an example. Other examples may differ from what is described with regard to FIG. 5.

FIG. 6 is a diagram illustrating an example 600 of an MCS table that may be used for adaptive non-uniform constellation operation, in accordance with the present disclosure. In some aspects, an MCS table may include a variety of information that may be used by a device to determine a modulation order (e.g., an M value for M-ary modulation) and a coding scheme (e.g., an amount of reliability and/or redundancy encoded in a transmission) for a particular transmission. For instance, as shown by the example 600, an MCS table may specify a modulation order, a target coding rate, and a spectral efficiency.

In some aspects, an MCS table includes modulation constellation type information, as shown by column 602 of the example 600. To illustrate, an MCS table may include different values associated with a modulation constellation type, such as a first value (e.g., "0") associated with a UC type and a second value (e.g., "1") associated with an NUC type. In some aspects, the MCS table may include multiple entries for a same spectral efficiency, where each entry specifies a particular modulation constellation type. To illustrate, a first row 604 of the MCS table, shown by the example 600 as being associated with index i of the MCS table, specifies a particular spectral efficiency (e.g., "2.5664"). Similarly, a second row 606 of the MCS table, shown by the example 600 as being associated with index i+1 of the MCS table, specifies the same particular spectral efficiency ("2.5664"). However, the MCS table entries associated with the rows 604 and 606 specify different modulation constellation types. The row 604, for instance, specifies a first modulation constellation type 608 (e.g., "0"), and the row 606 specifies a second modulation constellation type 610 (e.g., "1") that is different from the first modulation constellation type. Thus, a base station may configure a UE to process a wireless communication using the first modulation constellation type 608 by indicating an index value corresponding to i, and may configure the UE to process the wireless communication using the second modulation constellation type 610 by indicating an index value of i+1.

In some aspects, the base station may instruct the UE to activate and/or deactivate various MCS tables. As one example, an initial MCS table activated by the UE may omit modulation constellation type information (e.g., the column 602), which may implicitly indicate to base communications, at least in part, on a default modulation constellation type (e.g., a UC type). In response to indicating to the base station support for MCS tables that include modulation constellation type information, the UE may receive information from the base station that indicates to activate an MCS table that includes modulation constellation type information (e.g., as shown by the example 600). Alternatively or additionally, the UE may receive information to deactivate the initial MCS table that omits the modulation constellation type information. In some aspects, the base station transmits the information to activate and/or deactivate MCS tables as part of the modulation constellation type information as shown by the reference number 440 with regard to FIG. 4.

In some aspects, the base station may implicitly indicate a particular modulation constellation type by configuring and/or instructing the UE to activate a particular MCS table that has an association with the particular modulation constellation type. For instance, a first MCS table that omits explicit modulation constellation type information may have an association with a UC type, and a second MCS table that omits the explicit modulation constellation type information may have an association with an NUC type. The base station may implicitly instruct the UE to process communications based at least in part on the NUC type by transmitting information that indicates to activate the second MCS table, such as information that is part of the modulation constellation type information as shown by the reference number 440 with regard to FIG. 4.

Adaptive non-uniform constellation operation enables a base station and/or a UE to select and change modulation constellation types to reduce and/or mitigate recovery errors at a receiver and/or improve data throughput relative to other modulation constellation types. As further described, the base station and/or UE may select the modulation constellation type based at least in part on a current operating condition and/or a current communication channel condition, such as by selecting an M-ary NUC with improved performance for the current operating environment relative to an M-ary UC. Selecting switching modulation constellation types may improve the efficacy and/or spectral efficiency of the digital communications exchanged between a base station and UE, improve data throughput, reduce data-transfer latencies, and/or increase a quantity of devices supportable by a wireless communication network.

As indicated above, FIG. 6 is provided as an example. Other examples may differ from what is described with regard to FIG. 6.

Figure 7:
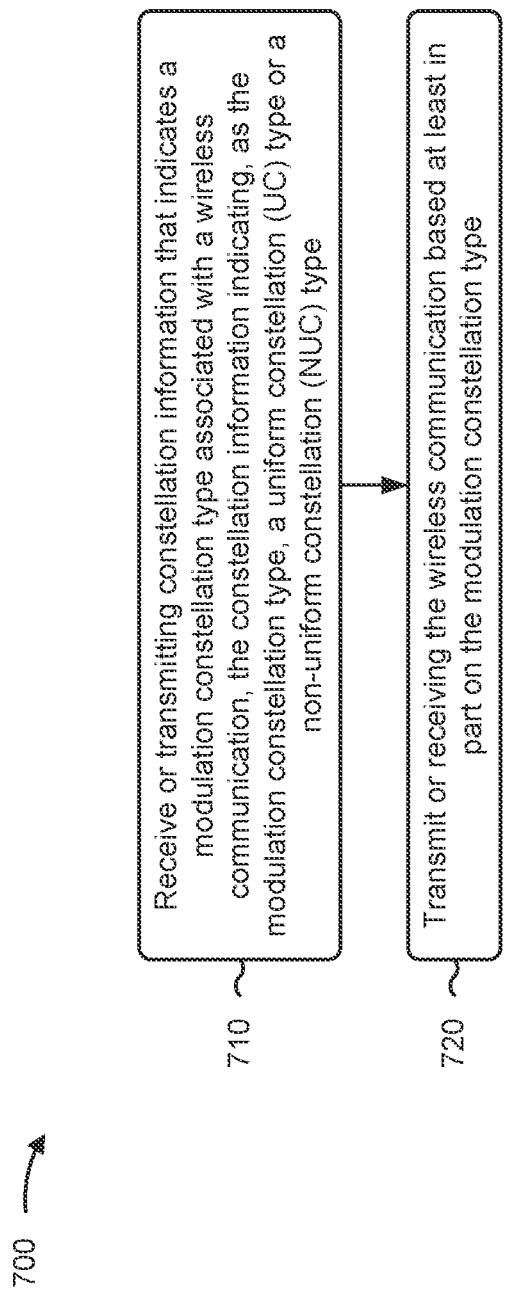
FIG. 7 is a diagram illustrating an example process in accordance with the present disclosure.

FIG. 7 is a diagram illustrating an example process 700 performed, for example, by a UE, in accordance with the present disclosure. Example process 700 is an example where the UE (e.g., UE 120) performs operations associated with adaptive non-uniform constellation operation.

As shown in FIG. 7, in some aspects, process 700 may include receiving or transmitting constellation information that indicates a modulation constellation type associated with a wireless communication, the constellation information indicating, as the modulation constellation type, a UC type or an NUC type (block 710). For example, the UE (e.g., using communication manager 140 and/or reception component 902, depicted in FIG. 9) may receive constellation information that indicates a modulation constellation type associated with a wireless communication, the constellation information indicating, as the modulation constellation type, a UC type or an NUC type, as described above. In some aspects, the UE may transmit the constellation information.

As further shown in FIG. 7, in some aspects, process 700 may include transmitting or receiving the wireless communication based at least in part on the modulation constellation type (block 720). For example, the UE (e.g., using communication manager 140 and/or transmission component 904, depicted in FIG. 9) may transmit the wireless communication based at least in part on the modulation constellation type, as described above. In some aspects, the UE may receive the wireless communication. Thus, the UE and/or the base station can modify the constellation type used by the UE, which enables the usage of different constellation types that are suited for different operating conditions.

Process 700 may include additional aspects, such as any single aspect or any combination of aspects described below and/or in connection with one or more other processes described elsewhere herein.

In a first aspect, the modulation constellation type is a second modulation constellation type, wherein receiving or transmitting the constellation information further comprises receiving or transmitting an indication to change from using a first modulation constellation type to the second modulation constellation type.

In a second aspect, alone or in combination with the first aspect, the first modulation constellation type is the UC type, and the second modulation constellation type is the NUC type.

In a third aspect, alone or in combination with one or more of the first and second aspects, receiving or transmitting the constellation information further comprises receiving or transmitting an index value that maps to an entry in a modulation and coding scheme (MCS) table, wherein the entry specifies the modulation constellation type. This provides an ability to dynamically change modulation constellation types efficiently (e.g., with less air interface resources) by indexing to an entry of the MCS table with a selected modulation constellation type.

In a fourth aspect, alone or in combination with one or more of the first through third aspects, the entry indicates, as the modulation constellation type, at least one of the UC type using a first value, or the NUC type using a second value that is different from the first value.

In a fifth aspect, alone or in combination with one or more of the first through fourth aspects, the entry in the MCS table is a first entry in the MCS table, wherein the modulation constellation type is a first modulation constellation type, wherein the first entry specifies a particular spectral efficiency, and wherein the MCS table includes at least a second entry that specifies the particular spectral efficiency, wherein the second entry specifies a second modulation constellation type that is different from the first modulation constellation type.

In a sixth aspect, alone or in combination with one or more of the first through fifth aspects, the modulation constellation type comprises at least one of a one-dimensional (1D) NUC type, a two-dimensional (2D) NUC type, or the UC type.

In a seventh aspect, alone or in combination with one or more of the first through sixth aspects, receiving or transmitting the constellation information further comprises receiving an indication to activate a modulation and coding scheme (MCS) table associated with the modulation constellation type.

In an eighth aspect, alone or in combination with one or more of the first through seventh aspects, receiving the indication to activate the MCS table comprises receiving the indication to activate the MCS table in at least one of downlinking control information, a medium access control (MAC) control element, or a radio resource control configuration message.

In a ninth aspect, alone or in combination with one or more of the first through eighth aspects, the indication to activate the MCS table further indicates to deactivate another MCS table that is different from the MCS table.

In a tenth aspect, alone or in combination with one or more of the first through ninth aspects, process 700 includes transmitting, to a base station, capability information that indicates support for demodulating communications associated with the NUC type.

In an eleventh aspect, alone or in combination with one or more of the first through tenth aspects, the capability information indicates support for communications associated with at least a first NUC type for a first modulation order, and a second NUC type for a second modulation order, wherein the second NUC type is different from the first NUC type. This allows UEs with different NUC capabilities to notify a base station of the respective supported NUC capabilities. This also allows a base station to optimize and/or select NUC types specific to a UE to improve performance based on the UE capabilities.

In a twelfth aspect, alone or in combination with one or more of the first through eleventh aspects, the capability information indicates support for an MCS table that indicates modulation constellation type information.

In a thirteenth aspect, alone or in combination with one or more of the first through twelfth aspects, process 700 includes transmitting, to a base station, information that indicates a UE-selected modulation constellation type. This allows a UE to select and communicate modulation constellation types based at least in part on distortion measured by the UE and improve performance relative to a base station selected modulation constellation type selected without knowledge of the UE-measured distortion.

In a fourteenth aspect, alone or in combination with one or more of the first through thirteenth aspects, process 700 includes identifying the UE-selected modulation constellation type based at least in part on an SNR metric, or an SCS associated with transmitting or receiving the wireless communication.

In a fifteenth aspect, alone or in combination with one or more of the first through fourteenth aspects, process 700 includes receiving MCS information from the base station, wherein transmitting or receiving the wireless communication based at least in part on the modulation constellation type comprises using, as the modulation constellation type for the wireless communication, the UE-selected modulation constellation type based at least in part on the MCS information.

In a sixteenth aspect, alone or in combination with one or more of the first through fifteenth aspects, the modulation constellation type is a first modulation constellation type, wherein the wireless communication is an initial wireless communication, wherein process 700 further comprises transmitting or receiving a retransmission of the initial wireless communication using a second modulation constellation type that is different from the first modulation constellation type.

In a seventeenth aspect, alone or in combination with one or more of the first through sixteenth aspects, the first modulation constellation type is the UC type and the second modulation constellation type is the NUC type, or wherein the first modulation constellation type is the NUC type and the second modulation constellation type is the UC type.

In an eighteenth aspect, alone or in combination with one or more of the first through seventeenth aspects, process 700 includes transmitting performance information associated with the first modulation constellation type and the second modulation constellation type.

In a nineteenth aspect, alone or in combination with one or more of the first through eighteenth aspects, transmitting the performance information further comprises transmitting the performance information in HARQ ACK/NACK feedback.

In a twentieth aspect, alone or in combination with one or more of the first through nineteenth aspects, process 700 includes indicating, to a base station, uplink constellation information that indicates a selected modulation constellation type for an uplink communication from the UE to the base station, the selected modulation constellation type being the UC type or the NUC type.

In a twenty-first aspect, alone or in combination with one or more of the first through twentieth aspects, indicating the uplink constellation information further comprises indicating the uplink constellation information in UCI.

In a twenty-second aspect, alone or in combination with one or more of the first through twenty-first aspects, the uplink constellation information indicates selection of a pre-configured modulation constellation type.

In a twenty-third aspect, alone or in combination with one or more of the first through twenty-second aspects, indicating the uplink constellation information further comprises indicating the uplink constellation information in an RRC message or a MAC CE.

In a twenty-fourth aspect, alone or in combination with one or more of the first through twenty-third aspects, process 700 includes indicating, to the base station, to change from the modulation constellation type to the selected modulation constellation type for the uplink communication.

In a twenty-fifth aspect, alone or in combination with one or more of the first through twenty-fourth aspects, indicating to change further comprises transmitting a UL DMRS sequence or a GI sequence associated with indicating to change from the modulation constellation type to the selected modulation constellation type for the uplink communication.

In a twenty-sixth aspect, alone or in combination with one or more of the first through twenty-fifth aspects, the modulation constellation type is a first modulation constellation type, wherein the first modulation constellation type is a layer-specific modulation constellation type or a frequency-specific modulation constellation type, and wherein transmitting or receiving the wireless communication based at least in part on the modulation constellation type further comprises transmitting or receiving a first layer of the wireless communication or a first frequency partition of the wireless communication using the first modulation constellation type, and transmitting or receiving a second layer of the wireless communication or a second frequency partition of the wireless communication using a second modulation constellation type that is different from the first modulation constellation type.

In a twenty-seventh aspect, alone or in combination with one or more of the first through twenty-sixth aspects, the first layer or the first frequency partition is associated with the first modulation constellation type, and the second layer or the second frequency partition is associated with the second modulation constellation type.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
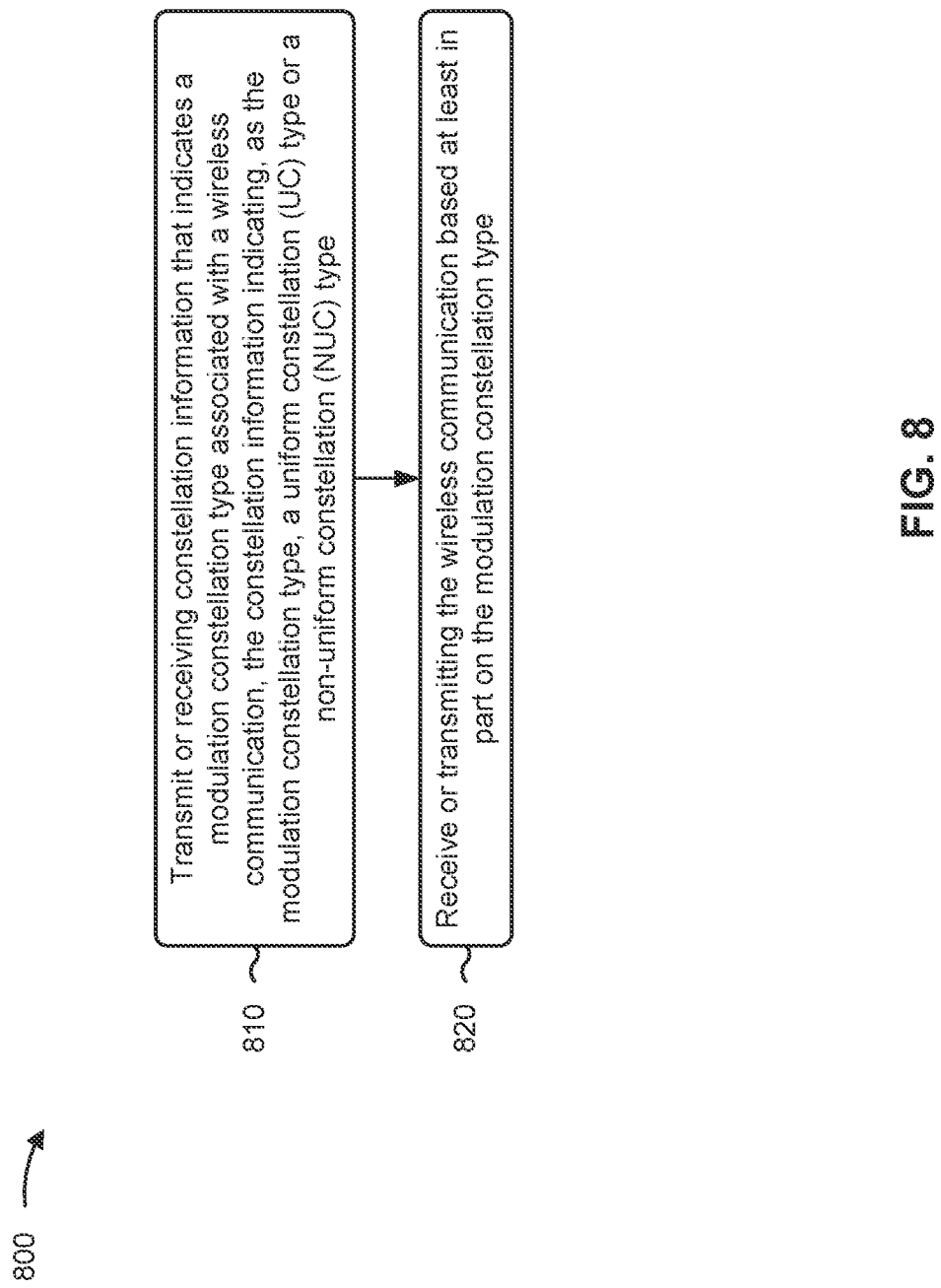
FIG. 8 is a diagram illustrating an example process in accordance with the present disclosure.

FIG. 8 is a diagram illustrating an example process 800 performed, for example, by a base station, in accordance with the present disclosure. Example process 800 is an example where the base station (e.g., base station 110) performs operations associated with adaptive non-uniform constellation operation.

As shown in FIG. 8, in some aspects, process 800 may include transmitting or receiving constellation information that indicates a modulation constellation type associated with a wireless communication, the constellation information indicating, as the modulation constellation type, a UC type or an NUC type (block 810). For example, the base station (e.g., using communication manager 150 and/or transmission component 1004, depicted in FIG. 10) may transmit constellation information that indicates a modulation constellation type associated with a wireless communication, the constellation information indicating, as the modulation constellation type, a UC type or an NUC type, as described above. In some aspects, the base station may receive the constellation information.

As further shown in FIG. 8, in some aspects, process 800 may include receiving or transmitting the wireless communication based at least in part on the modulation constellation type (block 820). For example, the base station (e.g., using communication manager 150 and/or reception component 1002, depicted in FIG. 10) may receive the wireless communication based at least in part on the modulation constellation type, as described above. In some aspects, the base station may transmit the wireless communication.

Process 800 may include additional aspects, such as any single aspect or any combination of aspects described below and/or in connection with one or more other processes described elsewhere herein.

In a first aspect, the modulation constellation type is a second modulation constellation type, and transmitting or receiving the constellation information further comprises transmitting or receiving an indication to change from using a first modulation constellation type to the second modulation constellation type.

In a second aspect, alone or in combination with the first aspect, the first modulation constellation type is the UC type, and the second modulation constellation type is the NUC type.

In a third aspect, alone or in combination with one or more of the first and second aspects, transmitting or receiving the constellation information further comprises transmitting or receiving an index value that maps to an entry in an MCS table, wherein the entry specifies the modulation constellation type.

In a fourth aspect, alone or in combination with one or more of the first through third aspects, the entry indicates, as the modulation constellation type, at least one of the UC type using a first value, or the NUC type using a second value that is different from the first value.

In a fifth aspect, alone or in combination with one or more of the first through fourth aspects, the entry in the MCS table is a first entry in the MCS table, wherein the modulation constellation type is a first modulation constellation type, wherein the first entry specifies a particular spectral efficiency, and the MCS table includes at least a second entry that specifies the particular spectral efficiency and a second modulation constellation type that is different from the first modulation constellation type.

In a sixth aspect, alone or in combination with one or more of the first through fifth aspects, process 800 includes selecting the modulation constellation type based at least in part on an operating condition.

In a seventh aspect, alone or in combination with one or more of the first through sixth aspects, the operating condition is one or more of a signal-to-noise ratio, a current modulation and coding scheme (MCS) assigned to the wireless communication, a code division multiplex (CDM) group associated with two or more demodulation reference signal (DMRS) ports, or a transmission configuration indicator (TCI) state.

In an eighth aspect, alone or in combination with one or more of the first through seventh aspects, selecting the modulation constellation type comprises selecting the modulation constellation type from at least a first NUC type and a second NUC type that is different from the first NUC type.

In a ninth aspect, alone or in combination with one or more of the first through eighth aspects, the modulation constellation type comprises at least one of a one-dimensional (1D) NUC type, a two-dimensional (2D) NUC type, or the UC type.

In a tenth aspect, alone or in combination with one or more of the first through ninth aspects, transmitting or receiving the constellation information further comprises transmitting an indication to activate a modulation and coding scheme (MCS) table associated with the modulation constellation type.

In an eleventh aspect, alone or in combination with one or more of the first through tenth aspects, transmitting the indication to activate the MCS table comprises transmitting the indication to activate the MCS table in at least one of downlinking control information, a medium access control (MAC) control element, or a radio resource control configuration message.

In a twelfth aspect, alone or in combination with one or more of the first through eleventh aspects, the indication to activate the MCS table further indicates to deactivate another MCS table that is different from the MCS table.

In a thirteenth aspect, alone or in combination with one or more of the first through twelfth aspects, process 800 includes receiving, from a user equipment, capability information that indicates support for demodulating communications associated with the NUC type.

In a fourteenth aspect, alone or in combination with one or more of the first through thirteenth aspects, the capability information indicates support for communications associated with at least a first NUC type for a first modulation order, and a second NUC type for a second modulation order, wherein the second NUC type is different from the first NUC type.

In a fifteenth aspect, alone or in combination with one or more of the first through fourteenth aspects, the capability information indicates support for an MCS table that indicates modulation constellation type information.

In a sixteenth aspect, alone or in combination with one or more of the first through fifteenth aspects, process 800 includes receiving, from UE, information that indicates a UE-selected modulation constellation type.

In a seventeenth aspect, alone or in combination with one or more of the first through sixteenth aspects, process 800 includes using, as the modulation constellation type for the wireless communication, the UE-selected modulation constellation type.

In an eighteenth aspect, alone or in combination with one or more of the first through seventeenth aspects, the modulation constellation type is a first modulation constellation type, wherein the wireless communication is an initial wireless communication, and wherein process 700 further comprises receiving or transmitting a retransmission of the initial wireless communication using a second modulation constellation type that is different from the first modulation constellation type.

In a nineteenth aspect, alone or in combination with one or more of the first through eighteenth aspects, the first modulation constellation type is the UC type and the second modulation constellation type is the NUC type, or wherein the first modulation constellation type is the NUC type and the second modulation constellation type is the UC type.

In a twentieth aspect, alone or in combination with one or more of the first through nineteenth aspects, process 800 includes receiving performance information associated with the first modulation constellation type and the second modulation constellation type.

In a twenty-first aspect, alone or in combination with one or more of the first through twentieth aspects, receiving the performance information further comprises receiving the performance information in hybrid automatic repeat request (HARQ) acknowledged/not acknowledged (ACK/NACK) feedback. This allows a base station to identify when changing modulation constellation types improve performance and/or when to select an additional modulation constellation type (e.g., different from the first and second modulation constellation types) to mitigate recovery errors.

In a twenty-second aspect, alone or in combination with one or more of the first through twenty-first aspects, process 800 includes receiving, from UE, uplink constellation information that indicates a selected modulation constellation type for an uplink communication from the UE to the base station, the selected modulation constellation type being the UC type or the NUC type.

In a twenty-third aspect, alone or in combination with one or more of the first through twenty-second aspects, receiving the uplink constellation information further comprises receiving the uplink constellation information in uplink control information (UCI).

In a twenty-fourth aspect, alone or in combination with one or more of the first through twenty-third aspects, the uplink constellation information indicates selection of a pre-configured modulation constellation type. Using pre-configured modulation type constellation provides the UE and the base station to communicate modulation constellation type information efficiently and quickly, relative to other messaging or signaling, by reducing an number of air interface resources (e.g., frequency and time) used to indicate the modulation constellation type information. This also allows the UE and the base station to change digital modulation schemes quickly to mitigate receiver errors.

In a twenty-fifth aspect, alone or in combination with one or more of the first through twenty-fourth aspects, receiving the uplink constellation information further comprises receiving the uplink constellation information in a radio resource control (RRC) message or a medium access control (MAC) control element (CE).

In a twenty-sixth aspect, alone or in combination with one or more of the first through twenty-fifth aspects, process 800 includes receiving, from the UE, an indication to change from the modulation constellation type to the selected modulation constellation type for the uplink communication.

In a twenty-seventh aspect, alone or in combination with one or more of the first through twenty-sixth aspects, receiving the indication to change further comprises receiving an uplink (UL) demodulation reference signal (DMRS) sequence or a guard interval (GI) sequence associated with the indication to change from the modulation constellation type to the selected modulation constellation type for the uplink communication.

In a twenty-eighth aspect, alone or in combination with one or more of the first through twenty-seventh aspects, the modulation constellation type is a first modulation constellation type, wherein the first modulation constellation type is a layer-specific modulation constellation type or a frequency-specific modulation constellation type, and wherein transmitting or receiving the wireless communication based at least in part on the modulation constellation type further comprises receiving or transmitting a first layer of the wireless communication or a first frequency partition of the wireless communication using the first modulation constellation type, and receiving or transmitting a second layer of the wireless communication or a second frequency partition of the wireless communication using a second modulation constellation type that is different from the first modulation constellation type. This allows for selection of modulation constellation types based on layers and/or partitions of a wireless communication that may have different channel conditions and improves an overall performance (e.g., reduces recovery errors, increases data throughput) of the wireless communication.

In a twenty-ninth aspect, alone or in combination with one or more of the first through twenty-eighth aspects, the first layer or the first frequency partition is associated with the first modulation constellation type, and the second layer or the second frequency partition is associated with the second modulation constellation type.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
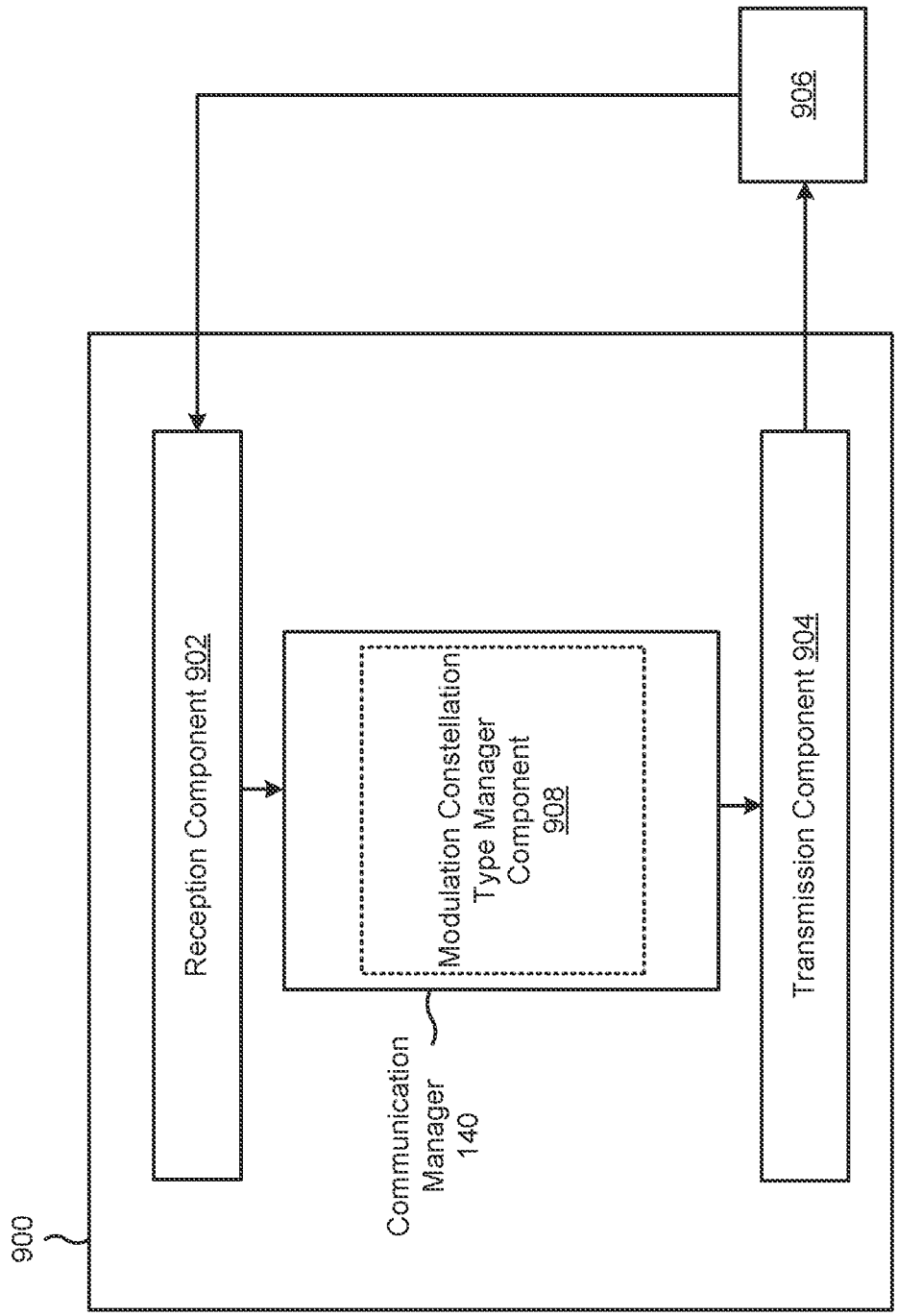
FIG. 9 is a diagram of an example apparatus for wireless communication in accordance with the present disclosure.

FIG. 9 is a diagram of an example apparatus 900 for wireless communication in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 900 (such as a UE, a base station, or another wireless communication device) using the reception component 902 and the transmission component 904. As further shown, the apparatus 900 may include the communication manager 140. The communication manager 140 may include one or more of a modulation constellation type manager component 908, among other examples.

In some aspects, the apparatus 900 may be configured to perform one or more operations described herein in connection with FIGS. 3-8. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the other apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the other apparatus 906. In some aspects, one or more other components of the apparatus 900 may generate communications and may provide the generated communications to the transmission component 904 for transmission to the other apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the other apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive or transmit constellation information that indicates a modulation constellation type associated with a wireless communication, the constellation information indicating, as the UC type or a NUC type. The transmission component 904 may transmit or receive the wireless communication based at least in part on the modulation constellation type.

The modulation constellation type manager component 908 may select a modulation constellation type and/or configure the apparatus 900 to process communications based at least in part on a modulation constellation type. The modulation constellation type manager component 908 may initiate transmissions by the transmission component 904, such as transmissions that include modulation constellation type information.

The transmission component 904 may transmit, to a base station, capability information that indicates support for demodulating communications associated with the NUC type.

The transmission component 904 may transmit, to a base station, information that indicates a UE-selected modulation constellation type.

The modulation constellation type manager component 908 may identify the UE-selected modulation constellation type based at least in part on an SNR metric, or am SCS associated with transmitting or receiving the wireless communication.

The reception component 902 may receive MCS information from the base station.

The transmission component 904 may transmit performance information associated with the first modulation constellation type and the second modulation constellation type, such as performance information generated and/or managed by the modulation constellation type manager component 908.

The modulation constellation type manager component 908 may direct the transmission component 904 to indicate, to a base station, uplink constellation information that indicates a selected modulation constellation type for an uplink communication from the UE to the base station, the selected modulation constellation type being the UC type or the NUC type.

The modulation constellation type manager component 908 may direct the transmission component 904 to indicate, to the base station, to change from the modulation constellation type to the UE-selected modulation constellation type for the uplink communication.

The transmission component 904 may transmit or receive constellation information that indicates a modulation constellation type associated with a wireless communication, the constellation information indicating, as the modulation constellation type, a UC type or a NUC type. The reception component 902 may receive or transmit the wireless communication based at least in part on the modulation constellation type.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
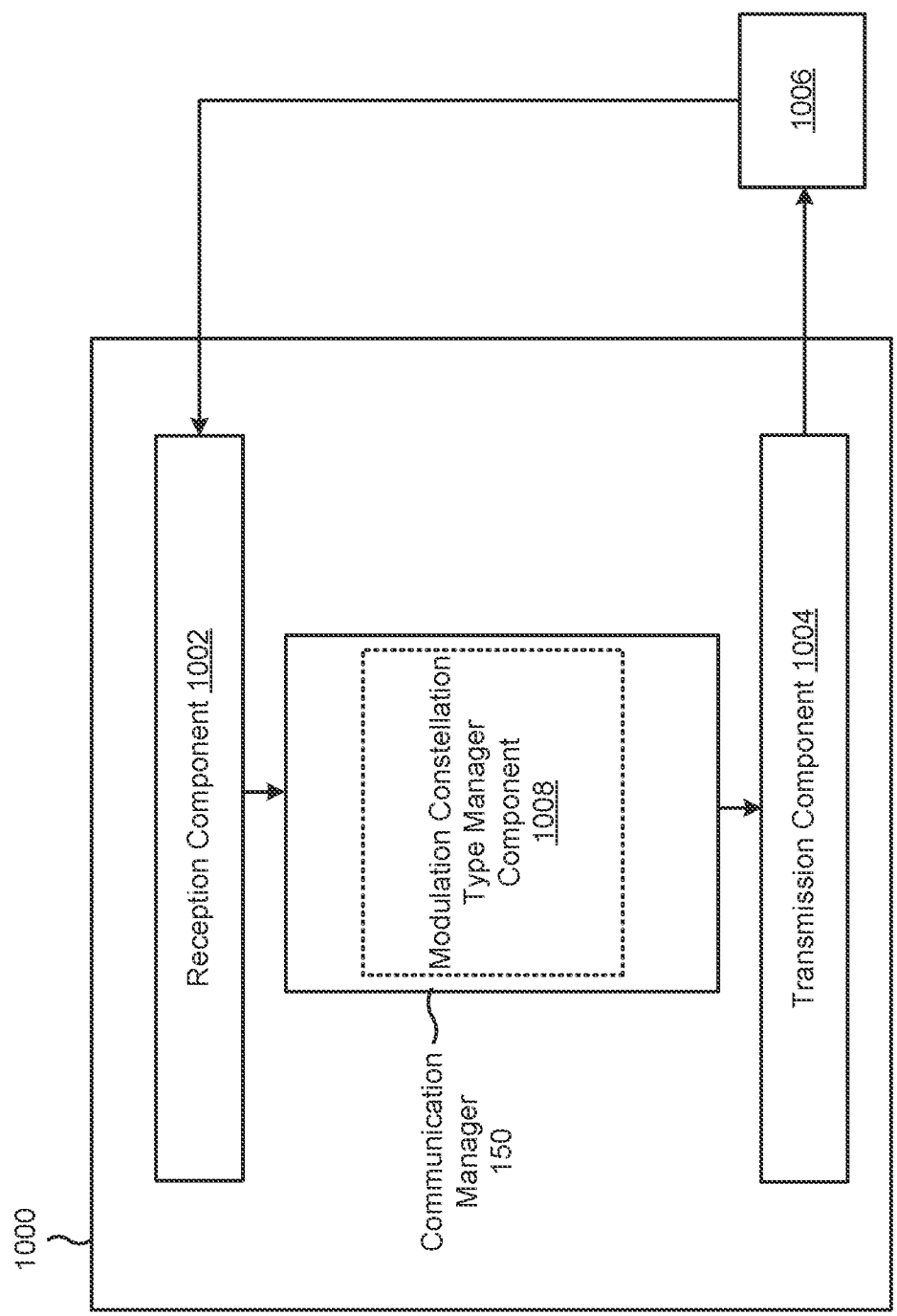
FIG. 10 is a diagram of an example apparatus for wireless communication in accordance with the present disclosure.

FIG. 10 is a diagram of an example apparatus 1000 for wireless communication in accordance with the present disclosure. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include one or more of a modulation constellation type manager component 1008, among other examples.

In some aspects, the apparatus 1000 may be configured to perform one or more operations described herein in connection with FIGS. 3-8. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the other apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the other apparatus 1006. In some aspects, one or more other components of the apparatus 1000 may generate communications and may provide the generated communications to the transmission component 1004 for transmission to the other apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the other apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The modulation constellation type manager component 1008 may select a modulation constellation type and/or configure the apparatus 1000 to process communications based at least in part on a modulation constellation type. The modulation constellation type manager component 1008 may initiate transmissions by the transmission component 1004, such as transmissions that include modulation constellation type information.

The reception component 1002 may receive or transmit constellation information that indicates a modulation constellation type associated with a wireless communication, the constellation information indicating, as the modulation constellation type, a UC type or an NUC type. The transmission component 1004 may transmit or receive the wireless communication based at least in part on the modulation constellation type.

The transmission component 1004 may transmit or receive constellation information that indicates a modulation constellation type associated with a wireless communication, the constellation information indicating, as the modulation constellation type, a UC type or an NUC type. The reception component 1002 may receive or transmit the wireless communication based at least in part on the modulation constellation type.

The modulation constellation type manager component 1008 may select the modulation constellation type based at least in part on an operating condition.

The reception component 1002 may receive, from a UE, capability information that indicates support for demodulating communications associated with the NUC type.

The reception component 1002 may receive, from a UE, information that indicates a UE-selected modulation constellation type.

The modulation constellation type manager may configure the apparatus 1000 to use, as the modulation constellation type for the wireless communication, the UE-selected modulation constellation type.

The reception component 1002 may receive performance information associated with the first modulation constellation type and the second modulation constellation type.

The reception component 1002 may receive, from a UE, uplink constellation information that indicates a selected modulation constellation type for an uplink communication from the UE to the base station, the selected modulation constellation type being the UC type or the NUC type.

The reception component 1002 may receive, from the UE, an indication to change from the modulation constellation type to the selected modulation constellation type for the uplink communication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by UE, comprising: receiving or transmitting constellation information that indicates a modulation constellation type associated with a wireless communication, the constellation information indicating, as the modulation constellation type, a uniform constellation (UC) type or a non-uniform constellation (NUC) type; and transmitting or receiving the wireless communication based at least in part on the modulation constellation type.

Aspect 2: The method of Aspect 1, wherein the modulation constellation type is a second modulation constellation type, and wherein receiving or transmitting the constellation information further comprises: receiving or transmitting an indication to change from using a first modulation constellation type to the second modulation constellation type.

Aspect 3: The method of Aspect 2, wherein the first modulation constellation type is the UC type, and wherein the second modulation constellation type is the NUC type.

Aspect 4: The method of any one of Aspects 1-3, wherein receiving or transmitting the constellation information further comprises: receiving or transmitting an index value that maps to an entry in a modulation and coding scheme (MCS) table, wherein the entry specifies the modulation constellation type.

Aspect 5: The method of Aspect 4, wherein the entry indicates, as the modulation constellation type, at least one of: the UC type using a first value, or the NUC type using a second value that is different from the first value.

Aspect 6: The method of Aspect 4 or Aspect 5, wherein the entry in the MCS table is a first entry in the MCS table, wherein the modulation constellation type is a first modulation constellation type, wherein the first entry specifies a particular spectral efficiency, and wherein the MCS table includes at least a second entry that specifies the particular spectral efficiency, wherein the second entry specifies a second modulation constellation type that is different from the first modulation constellation type.

Aspect 7: The method of any one of Aspects 1-6, wherein the modulation constellation type comprises at least one of: a one-dimensional (1D) NUC type, a two-dimensional (2D) NUC type, or the UC type.

Aspect 8: The method of any one of Aspects 1-7, wherein receiving or transmitting the constellation information further comprises: receiving an indication to activate a modulation and coding scheme (MCS) table associated with the modulation constellation type.

Aspect 9: The method of Aspect 8, wherein receiving the indication to activate the MCS table comprises: receiving the indication to activate the MCS table in at least one of: downlink control information, a medium access control (MAC) control element, or a radio resource control configuration message.

Aspect 10: The method of Aspect 8 or Aspect 9, wherein the indication to activate the MCS table further indicates to deactivate another MCS table that is different from the MCS table.

Aspect 11: The method of any one of Aspects 1-10, further comprising: transmitting, to a base station, capability information that indicates support for demodulating communications associated with the NUC type.

Aspect 12: The method of Aspect 11, wherein the capability information indicates support for communications associated with at least: a first NUC type for a first modulation order; and a second NUC type for a second modulation order, wherein the second NUC type is different from the first NUC type.

Aspect 13: The method of Aspect 11 or Aspect 12, wherein the capability information indicates support for an MCS table that indicates modulation constellation type information.

Aspect 14: The method of any one of Aspects 1-13, further comprising: transmitting, to a base station, information that indicates a user equipment-selected (UE-selected) modulation constellation type.

Aspect 15: The method of Aspect 14, further comprising: identifying the UE-selected modulation constellation type based at least in part on: a signal-to-noise radio (SNR) metric, or a sub-carrier spacing (SCS) associated with transmitting or receiving the wireless communication.

Aspect 16: The method of Aspect 14 or Aspect 15, further comprising: receiving MCS information from the base station, and wherein transmitting or receiving the wireless communication based at least in part on the modulation constellation type comprises: using, as the modulation constellation type for the wireless communication, the UE-selected modulation constellation type based at least in part on the MCS information. wherein transmitting or receiving the wireless communication based at least in part on the modulation constellation type comprises: using, as the modulation constellation type for the wireless communication, the UE-selected modulation constellation type based at least in part on the MCS information.

Aspect 17: The method of any one of Aspects 1-16, wherein the modulation constellation type is a first modulation constellation type, wherein the wireless communication is an initial wireless communication, and wherein the method further comprises transmitting or receiving a retransmission of the initial wireless communication using a second modulation constellation type that is different from the first modulation constellation type.

Aspect 18: The method of Aspect 17, wherein the first modulation constellation type is the UC type and the second modulation constellation type is the NUC type, or wherein the first modulation constellation type is the NUC type and the second modulation constellation type is the UC type.

Aspect 19: The method of Aspect 17 or Aspect 18, further comprising: transmitting performance information associated with the first modulation constellation type and the second modulation constellation type.

Aspect 20: The method of Aspect 19, wherein transmitting the performance information further comprises: transmitting the performance information in hybrid automatic repeat request (HARQ) acknowledged/not acknowledged (ACK/NACK) feedback.

Aspect 21: The method of any one of Aspects 1-20, further comprising: indicating, to a base station, uplink constellation information that indicates a selected modulation constellation type for an uplink communication from the UE to the base station, the selected modulation constellation type being the UC type or the NUC type.

Aspect 22: The method of Aspect 21, wherein indicating the uplink constellation information further comprises: indicating the uplink constellation information in uplink control information (UCI).

Aspect 23: The method of Aspect 21 or Aspect 22, wherein the uplink constellation information indicates selection of a pre-configured modulation constellation type.

Aspect 24: The method of Aspect 23, wherein indicating the uplink constellation information further comprises: indicating the uplink constellation information in a radio resource control (RRC) message or a medium access control (MAC) control element (CE).

Aspect 25: The method of any one of Aspects 21-24, further comprising: indicating, to the base station, to change from the modulation constellation type to the selected modulation constellation type for the uplink communication.

Aspect 26: The method of Aspect 25, wherein indicating to change further comprises: transmitting an uplink (UL) demodulation reference signal (DMRS) sequence or a guard interval (GI) sequence associated with indicating to change from the modulation constellation type to the selected modulation constellation type for the uplink communication.

Aspect 27: The method of any one of Aspects 1-26, wherein the modulation constellation type is a first modulation constellation type, wherein the first modulation constellation type is a layer-specific modulation constellation type or a frequency-specific modulation constellation type, and wherein transmitting or receiving the wireless communication based at least in part on the modulation constellation type further comprises: transmitting or receiving a first layer of the wireless communication or a first frequency partition of the wireless communication using the first modulation constellation type; and transmitting or receiving a second layer of the wireless communication or a second frequency partition of the wireless communication using a second modulation constellation type that is different from the first modulation constellation type.

Aspect 28: The method of Aspect 27, wherein the first layer or the first frequency partition is associated with the first modulation constellation type, and wherein the second layer or the second frequency partition is associated with the second modulation constellation type.

Aspect 29: A method of wireless communication performed by a base station, comprising: transmitting or receiving constellation information that indicates a modulation constellation type associated with a wireless communication, the constellation information indicating, as the modulation constellation type, a uniform constellation (UC) type or a non-uniform constellation (NUC) type; and receiving or transmitting the wireless communication based at least in part on the modulation constellation type.

Aspect 30: The method of Aspect 29, wherein the modulation constellation type is a second modulation constellation type, and wherein transmitting or receiving the constellation information further comprises: transmitting or receiving an indication to change from using a first modulation constellation type to the second modulation constellation type.

Aspect 31: The method of Aspect 30, wherein the first modulation constellation type is the UC type, and wherein the second modulation constellation type is the NUC type.

Aspect 32: The method of any one of Aspects 29-31, wherein transmitting or receiving the constellation information further comprises: transmitting or receiving an index value that maps to an entry in a modulation and coding scheme (MCS) table, wherein the entry specifies the modulation constellation type.

Aspect 33: The method of Aspect 32, wherein the entry indicates, as the modulation constellation type, at least one of: the UC type using a first value, or the NUC type using a second value that is different from the first value.

Aspect 34: The method of Aspect 32 or Aspect 33, wherein the entry in the MCS table is a first entry in the MCS table, wherein the modulation constellation type is a first modulation constellation type, wherein the first entry specifies a particular spectral efficiency, and wherein the MCS table includes at least a second entry that specifies the particular spectral efficiency and a second modulation constellation type that is different from the first modulation constellation type.

Aspect 35: The method of any one of Aspects 29-34, further comprising: selecting the modulation constellation type based at least in part on an operating condition.

Aspect 36: The method of Aspect 35, wherein the operating condition is one or more of: a signal-to-noise ratio, a current modulation and coding scheme (MCS) assigned to the wireless communication, a code division multiplex (CDM) group associated with two or more demodulation reference signal (DMRS) ports, or a transmission configuration indicator (TCI) state.

Aspect 37: The method of Aspect 35 or Aspect 36, wherein selecting the modulation constellation type comprises: selecting the modulation constellation type from at least a first NUC type and a second NUC type that is different from the first NUC type.

Aspect 38: The method of any one of Aspects 29-37, wherein the modulation constellation type comprises at least one of: a one-dimensional (1D) NUC type, a two-dimensional (2D) NUC type, or the UC type.

Aspect 39: The method of any one of Aspects 29-38, wherein transmitting or receiving the constellation information further comprises: transmitting an indication to activate a modulation and coding scheme (MCS) table associated with the modulation constellation type.

Aspect 40: The method of Aspect 39, wherein transmitting the indication to activate the MCS table comprises: transmitting the indication to activate the MCS table in at least one of: downlink control information, a medium access control (MAC) control element, or a radio resource control configuration message.

Aspect 41: The method of Aspect 39 or Aspect 40, wherein the indication to activate the MCS table further indicates to deactivate another MCS table that is different from the MCS table.

Aspect 42: The method of any one of Aspects 29-41, further comprising: receiving, from a user equipment, capability information that indicates support for demodulating communications associated with the NUC type.

Aspect 43: The method of Aspect 42, wherein the capability information indicates support for communications associated with at least: a first NUC type for a first modulation order; and a second NUC type for a second modulation order, wherein the second NUC type is different from the first NUC type.

Aspect 44: The method of Aspect 42 or Aspect 43, wherein the capability information indicates support for an MCS table that indicates modulation constellation type information.

Aspect 45: The method of any one of Aspects 29-44, further comprising: receiving, from UE, information that indicates a UE-selected modulation constellation type.

Aspect 46: The method of Aspect 45, further comprising: using, as the modulation constellation type for the wireless communication, the UE-selected modulation constellation type.

Aspect 47: The method of any one of Aspects 29-46, wherein the modulation constellation type is a first modulation constellation type, wherein the wireless communication is an initial wireless communication, and wherein the method further comprises: receiving or transmitting a retransmission of the initial wireless communication using a second modulation constellation type that is different from the first modulation constellation type.

Aspect 48: The method of Aspect 47, wherein the first modulation constellation type is the UC type and the second modulation constellation type is the NUC type, or wherein the first modulation constellation type is the NUC type and the second modulation constellation type is the UC type.

Aspect 49: The method of Aspect 47 or Aspect 48, further comprising: receiving performance information associated with the first modulation constellation type and the second modulation constellation type.

Aspect 50: The method of Aspect 49, wherein receiving the performance information further comprises: receiving the performance information in hybrid automatic repeat request (HARQ) acknowledged/not acknowledged (ACK/NACK) feedback.

Aspect 51: The method of any one of Aspects 29-50, further comprising: receiving, from UE, uplink constellation information that indicates a selected modulation constellation type for an uplink communication from the UE to the base station, the selected modulation constellation type being the UC type or the NUC type.

Aspect 52: The method of Aspect 51, wherein receiving the uplink constellation information further comprises: receiving the uplink constellation information in uplink control information (UCI).

Aspect 53: The method of Aspect 51 or Aspect 52, wherein the uplink constellation information indicates selection of a pre-configured modulation constellation type.

Aspect 54: The method of Aspect 53, wherein receiving the uplink constellation information further comprises: receiving the uplink constellation information in a radio resource control (RRC) message or a medium access control (MAC) control element (CE).

Aspect 55: The method of any one of Aspects 51-54, further comprising: receiving, from the UE, an indication to change from the modulation constellation type to the selected modulation constellation type for the uplink communication.

Aspect 56: The method of Aspect 55, wherein receiving the indication to change further comprises: receiving an uplink (UL) demodulation reference signal (DMRS) sequence or a guard interval (GI) sequence associated with the indication to change from the modulation constellation type to the selected modulation constellation type for the uplink communication.

Aspect 57: The method of any one of Aspects 29-56, wherein the modulation constellation type is a first modulation constellation type, wherein the first modulation constellation type is a layer-specific modulation constellation type or a frequency-specific modulation constellation type, and wherein transmitting or receiving the wireless communication based at least in part on the modulation constellation type further comprises: receiving or transmitting a first layer of the wireless communication or a first frequency partition of the wireless communication using the first modulation constellation type; and receiving or transmitting a second layer of the wireless communication or a second frequency partition of the wireless communication using a second modulation constellation type that is different from the first modulation constellation type.

Aspect 58: The method of Aspect 57, wherein the first layer or the first frequency partition is associated with the first modulation constellation type, and wherein the second layer or the second frequency partition is associated with the second modulation constellation type.

Aspect 59: An apparatus for wireless communication at a device, comprising a processor; memory coupled with the processor; and instructions stored in the memory and executable by the processor to cause the apparatus to perform the method of one or more of Aspects 1-28.

Aspect 60: A device for wireless communication, comprising a memory and one or more processors coupled to the memory, the one or more processors configured to perform the method of one or more of Aspects 1-28.

Aspect 61: An apparatus for wireless communication, comprising at least one means for performing the method of one or more of Aspects 1-28.

Aspect 62: A non-transitory computer-readable medium storing code for wireless communication, the code comprising instructions executable by a processor to perform the method of one or more of Aspects 1-28.

Aspect 63: A non-transitory computer-readable medium storing a set of instructions for wireless communication, the set of instructions comprising one or more instructions that, when executed by one or more processors of a device, cause the device to perform the method of one or more of Aspects 1-28.

Aspect 64: An apparatus for wireless communication at a device, comprising a processor; memory coupled with the processor; and instructions stored in the memory and executable by the processor to cause the apparatus to perform the method of one or more of Aspects 29-58.

Aspect 65: A device for wireless communication, comprising a memory and one or more processors coupled to the memory, the one or more processors configured to perform the method of one or more of Aspects 29-58.

Aspect 66: An apparatus for wireless communication, comprising at least one means for performing the method of one or more of Aspects 29-58.

Aspect 67: A non-transitory computer-readable medium storing code for wireless communication, the code comprising instructions executable by a processor to perform the method of one or more of Aspects 29-58.

Aspect 68: A non-transitory computer-readable medium storing a set of instructions for wireless communication, the set of instructions comprising one or more instructions that, when executed by one or more processors of a device, cause the device to perform the method of one or more of Aspects 29-58.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, configured to:
transmit capability information that indicates support of communications associated with a non-uniform constellation (NUC) type;
receive or transmit constellation information that indicates a modulation constellation type associated with a wireless communication, the constellation information indicating, as the modulation constellation type, a uniform constellation (UC) type or the NUC type; and
transmit or receive the wireless communication based at least in part on the modulation constellation type,
wherein the modulation constellation type is a first modulation constellation type,
wherein the first modulation constellation type is a layer-specific modulation constellation type or a frequency-specific modulation constellation type, and
wherein the one or more processors, to transmit or receive the wireless communication based at least in part on the modulation constellation type, are configured to:
transmit or receive a first layer of the wireless communication or a first frequency partition of the wireless communication using the first modulation constellation type; and
transmit or receive a second layer of the wireless communication or a second frequency partition of the wireless communication using a second modulation constellation type that is different from the first modulation constellation type.

2. The apparatus of claim 1, wherein the modulation constellation type is a second modulation constellation type, and
wherein the one or more processors configured to receive or transmit the constellation information are further configured to:
receive or transmit an indication to change from using a first modulation constellation type to the second modulation constellation type.

3. The apparatus of claim 1, wherein the one or more processors, to receive or transmit the constellation information, are configured to:
receive or transmit an index value that maps to an entry in a modulation and coding scheme (MCS) table, wherein the entry specifies the modulation constellation type.

4. The apparatus of claim 1, wherein the modulation constellation type comprises at least one of:
a one-dimensional (1D) NUC type,
a two-dimensional (2D) NUC type, or
the UC type.

5. The apparatus of claim 1, wherein the one or more processors, to receive or transmit the constellation information, are configured to:
receive an indication to activate a modulation and coding scheme (MCS) table associated with the modulation constellation type.

6. The apparatus of claim 1, wherein the capability information indicates support for communications associated with at least:
a first NUC type for a first modulation order; and
a second NUC type for a second modulation order, wherein the second NUC type is different from the first NUC type.

7. The apparatus of claim 1, wherein the one or more processors are further configured to:
transmit information that indicates a user equipment-selected (UE-selected) modulation constellation type.

8. The apparatus of claim 1, wherein the modulation constellation type is a first modulation constellation type,
wherein the wireless communication is an initial wireless communication, and
wherein the one or more processors are further configured to transmit or receive a retransmission of the initial wireless communication using a second modulation constellation type that is different from the first modulation constellation type.

9. The apparatus of claim 8, wherein the one or more processors are further configured to:
transmit performance information associated with the first modulation constellation type and the second modulation constellation type.

10. The apparatus of claim 1, wherein the one or more processors are further configured to:
indicate uplink constellation information that indicates a selected modulation constellation type for an uplink communication, the selected modulation constellation type being the UC type or the NUC type.

11. The apparatus of claim 10, wherein the uplink constellation information indicates selection of a pre-configured modulation constellation type.

12. The apparatus of claim 10, wherein the one or more processors are further configured to:
indicate to change from the modulation constellation type to the selected modulation constellation type for the uplink communication.

13. An apparatus for wireless communication at a network entity, comprising:
a memory; and
one or more processors, coupled to the memory, configured to:
receive capability information that indicates support of communications associated with a non-uniform constellation (NUC) type;
transmit or receive constellation information that indicates a modulation constellation type associated with a wireless communication, the constellation information indicating, as the modulation constellation type, a uniform constellation (UC) type or the NUC type; and
receive or transmit the wireless communication based at least in part on the modulation constellation type,
wherein the modulation constellation type is a first modulation constellation type,
wherein the first modulation constellation type is a layer-specific modulation constellation type or a frequency-specific modulation constellation type, and
wherein the one or more processors, to transmit or receive the wireless communication based at least in part on the modulation constellation type, are further configured to:
receive or transmit a first layer of the wireless communication or a first frequency partition of the wireless communication using the first modulation constellation type; and
receive or transmit a second layer of the wireless communication or a second frequency partition of the wireless communication using a second modulation constellation type that is different from the first modulation constellation type.

14. The apparatus of claim 13, wherein the modulation constellation type is a second modulation constellation type, and
wherein the one or more processors, to transmit or receive the constellation information, are configured to:
transmit or receive an indication to change from using a first modulation constellation type to the second modulation constellation type.

15. The apparatus of claim 13, wherein the one or more processors, to transmit or receive the constellation information, are configured to:
transmit or receive an index value that maps to an entry in a modulation and coding scheme (MCS) table, wherein the entry specifies the modulation constellation type.

16. The apparatus of claim 13, wherein the one or more processors are further configured to:
select the modulation constellation type based at least in part on an operating condition.

17. The apparatus of claim 13, wherein the one or more processors, to transmit or receive the constellation information, are configured to:
transmit an indication to activate a modulation and coding scheme (MCS) table associated with the modulation constellation type.

18. The apparatus of claim 13, wherein the one or more processors are further configured to:
receive information that indicates a user equipment-selected modulation constellation type.

19. The apparatus of claim 13, wherein the modulation constellation type is a first modulation constellation type,
wherein the wireless communication is an initial wireless communication, and
wherein the one or more processors are further configured to:
receive or transmit a retransmission of the initial wireless communication using a second modulation constellation type that is different from the first modulation constellation type.

20. A method of wireless communication performed by a user equipment (UE), comprising:
transmitting capability information that indicates support of communications associated with a non-uniform constellation (NUC) type;
receiving or transmitting constellation information that indicates a modulation constellation type associated with a wireless communication, the constellation information indicating, as the modulation constellation type, a uniform constellation (UC) type or the NUC type; and
transmitting or receiving the wireless communication based at least in part on the modulation constellation type,
wherein the modulation constellation type is a first modulation constellation type, wherein the first modulation constellation type is a layer-specific modulation constellation type or a frequency-specific modulation constellation type, and wherein transmitting or receiving the wireless communication based at least in part on the modulation constellation type further comprises:
transmitting or receiving a first layer of the wireless communication or a first frequency partition of the wireless communication using the first modulation constellation type; and
transmitting or receiving a second layer of the wireless communication or a second frequency partition of the wireless communication using a second modulation constellation type that is different from the first modulation constellation type.

21. The method of claim 20, wherein receiving or transmitting the constellation information further comprises:
receiving or transmitting an index value that maps to an entry in a modulation and coding scheme (MCS) table, wherein the entry specifies the modulation constellation type.

22. A method of wireless communication performed by a network entity, comprising:
receiving capability information that indicates support of communications associated with a non-uniform constellation (NUC) type;
transmitting or receiving constellation information that indicates a modulation constellation type associated with a wireless communication, the constellation information indicating, as the modulation constellation type, a uniform constellation (UC) type or the NUC type; and
receiving or transmitting the wireless communication based at least in part on the modulation constellation type,
wherein the modulation constellation type is a first modulation constellation type,
wherein the first modulation constellation type is a layer-specific modulation constellation type or a frequency-specific modulation constellation type, and
wherein the one or more processors, to transmit or receive the wireless communication based at least in part on the modulation constellation type, are further configured to:
receive or transmit a first layer of the wireless communication or a first frequency partition of the wireless communication using the first modulation constellation type; and
receive or transmit a second layer of the wireless communication or a second frequency partition of the wireless communication using a second modulation constellation type that is different from the first modulation constellation type.

23. The method of claim 22, wherein the modulation constellation type is a second modulation constellation type, and wherein transmitting or receiving the constellation information further comprises:
transmitting or receiving an indication to change from using a first modulation constellation type to the second modulation constellation type.

24. The method of claim 22, further comprising:
selecting the modulation constellation type based at least in part on an operating condition.

25. The method of claim 22, wherein receiving or transmitting the constellation information comprises:
receiving or transmitting an index value that maps to an entry in a modulation and coding scheme (MCS) table, wherein the entry specifies the modulation constellation type.

26. The method of claim 22, wherein the capability information indicates support for communications associated with at least:
a first NUC type for a first modulation order; and
a second NUC type for a second modulation order, wherein the second NUC type is different from the first NUC type.

27. The method of claim 22, further comprising:
transmitting information that indicates a user equipment-selected (UE-selected) modulation constellation type.

* * * * *